United States Patent [19]

Warmack

[11] Patent Number: 4,561,074

[45] Date of Patent: Dec. 24, 1985

[54] COMPUTATIONALLY EFFICIENT WEIGHTING AND VERTICAL STACKING METHODS AND APPARATUS FOR IMPROVING THE SIGNAL-TO-NOISE RATIO OF SEISMIC DATA

[75] Inventor: Ralph E. Warmack, Kingwood, Tex.

[73] Assignee: Amoco Corporation, Chicago, Ill.

[21] Appl. No.: 454,401

[22] Filed: Dec. 29, 1982

[51] Int. Cl.$^4$ .............................................. G01V 1/00
[52] U.S. Cl. ...................................... 367/46; 367/62; 367/63; 364/421
[58] Field of Search ........................ 367/22, 37, 38, 39, 367/40, 46, 62, 63; 364/421, 422, 581, 582; 343/378, 383, 384

[56] References Cited

U.S. PATENT DOCUMENTS

| | | | |
|---|---|---|---|
| 2,688,124 | 8/1954 | Doty et al. | 367/41 |
| 3,213,411 | 10/1965 | Loring | 364/421 X |
| 3,275,980 | 9/1966 | Foster | 364/422 X |
| 3,398,396 | 8/1968 | Embree | 367/63 X |
| 3,413,473 | 11/1968 | Mills, Jr. | 364/422 X |
| 3,534,401 | 10/1970 | Karvella et al. | 364/422 X |
| 3,689,874 | 9/1972 | Foster et al. | 367/46 |
| 3,744,019 | 7/1973 | Schmitt | 367/60 |
| 3,806,864 | 4/1974 | Broding et al. | 367/77 X |
| 3,894,222 | 7/1975 | Siems | 364/421 X |
| 3,946,357 | 3/1976 | Weinstein et al. | 367/63 X |
| 4,218,766 | 8/1980 | Parrack et al. | 364/421 X |
| 4,314,347 | 2/1982 | Stokely | 364/421 X |
| 4,344,158 | 8/1982 | Landrum, Jr. et al. | 367/47 X |
| 4,397,006 | 8/1983 | Galbraith, Jr. | 364/421 X |
| 4,468,761 | 8/1984 | Rietsch | 367/21 X |

OTHER PUBLICATIONS

Robinson, John C., "Statistically Optimal Stacking of Seismic Data", Geophysics, vol. 35, No. 3, Jun. 1970, pp. 437–446.
Sheriff, R. E., Encyclopedic Dictionary of Exploration Geophysics, Society of Exploration Geophysicists, Tulsa, Oklahoma, 1/23/75, pp. 60, 207.

*Primary Examiner*—Charles T. Jordan
*Assistant Examiner*—Brian S. Steinberger
*Attorney, Agent, or Firm*—Timothy D. Stanley

[57] ABSTRACT

This disclosure relates to improved methods and apparatus for vertically stacking seismic-trace data collected by a digital field recorder during seismic prospecting utilizing plural initiations of a low energy surface seismic source. Seismic-trace data generated by consecutive seismic source initiations and acquired at a common detector location is weighted and summed together, and the sum is normalized prior to being recorded. Accordingly, the signal-to-noise ratio of the seismic-trace data is improved. The methods and apparatus by which the weighting values are calculated and applied provides computational simplifications which reduce the program storage requirements and increase the computation speed of the microcomputer circuit preferably used to perform the calculations and leads to savings in hardware power, size, and complexity.

20 Claims, 18 Drawing Figures

(A) INPUT/OUTPUT FORMAT (2 BYTES)

(B) INTERNAL FORMAT (4 BYTES)

COMPUTATIONALLY EFFICIENT WEIGHTING AND VERTICAL STACKING METHODS AND APPARATUS FOR IMPROVING THE SINGLE-TO-NOISE RATIO OF SEISMIC DATA

BACKGROUND OF THE INVENTION

This invention relates to geophysical exploration for petroleum and minerals. More particularly, this invention is directed to geophysical prospecting by means of the seismic technique.

Seismic prospecting involves generating seismic waves at the surface of the earth by means of a seismic source. The seismic waves travel downward into the earth and are reflected and/or refracted due to differences in acoustic impedance at the interfaces of various subsurface geological formations. Detectors, called seismometers, or geophones, located along the surface of the earth and/or in a borehole produce analog electrical seismic-trace signals in response to detected seismic wave reflections and/or refractions. The analog electrical seismic-trace signals from the seismometers, or geophones, can then be recorded. Alternatively, the analog electrical seismic-trace signals from the seismometers, or geophones, can be sampled and digitized prior to being recorded. The seismic-trace data recorded in either manner is subsequently processed and analyzed for determining the nature and structure of the subsurface formations. Specifically, this invention is directed to the suppression of noise which is present in the seismic-trace data, especially in the case where a low energy surface seismic source, such as a vibrator, is used for imparting seismic energy to the earth.

Many techniques for generating and recording seismic waves are currently in use. Exploding-gas and compressed-air guns and dynamite are examples of high energy seismic sources which generate a sharp pulse (impulse) of seismic energy. Vibrators, which generate a "chirp" signal of seismic energy, and hammers are examples of low energy surface seismic sources. In the case of vibrators, the recorded seismic reflections and/or refractions are cross-correlated with a replica (called the "pilot signal") of the original "chirp" signal in order to produce recordings similar to those which would have been produced with a high energy impulsive seismic source. This process is known as "vibroseis."

Considered in more detail, vibroseis seismic prospecting, commercialized by Continental Oil Company, typically employs a large, vehicle-mounted vibrator as a seismic source. The vehicle is deployed to a prospect area, and the vibrator is positioned in contact with the surface of the earth. Thereafter, the vibrator is activated for imparting vibrations to the earth, thereby causing seismic waves to propagate through the subsurface formations. The seismic wave reflections and/or refractions are detected by seismometers, or geophones, deployed in the prospect area.

Advantageously, the use of a vibrator can be more economical than the use of dynamite. Furthermore, as compared to the use of a high energy impulsive seismic source, such as dynamite, the frequency of the seismic waves generated by a vibrator can be selected by controlling the frequency of the pilot signal to the power source, such as a hydraulic motor, which drives the vibrator. More particularly, the frequency of the pilot signal to the vibrator power source can be varied, that is, "swept," for obtaining seismic-trace data at different frequencies. Consider, for example, Doty et al. U.S. Pat. No. 2,688,124 which discloses how a low energy seismic wave, such as generated by a vibrator, can be used effectively for seismic prospecting if the frequency of the vibrator "chirp" signal which generates the seismic wave is swept according to a known pilot signal and the detected seismic wave reflections and/or refractions are cross-correlated with the pilot signal in order to produce seismic-trace recordings similar to those which would have been produced with a high energy impulsive seismic source. Typically, the pilot signal is a swept frequency sine wave which causes the vibrator power source to drive the vibrator for coupling a swept sine wave "chirp" signal into the earth. A typical swept frequency operation can employ, for example, a 10- to 20-second long sine wave "chirp" signal with a frequency sweep of 14 to 56 Hz. The swept frequency operation yields seismic-trace data which enables the different earth responses to be analyzed, thereby providing a basis on which to define the structure, such as the depth and thickness, of the subsurface formations.

Unfortunately, recorded seismic-trace data always includes some background (ambient) noise in addition to the detected seismic waves reflected and/or refracted from the subsurface formations (referred to as the "seismic signal"). Ambient noise is not repeatable with or dependent upon the seismic source. The ambient noise appears in many forms, such as atmospheric electromagnetic disturbances, and often occurs as bursts, or spikes, generally caused by wind, traffic, recorder electrical noise, etc.

When high energy impulsive seismic sources are used, the level of the detected seismic signal is usually greater than the ambient noise. However, when low energy surface seismic sources are used, the ambient noise can be at a level greater than the seismic signal. For this reason, seismic-trace recordings are often made involving the repeated initiation of a low energy surface seismic source at about the same origination point, thereby producing a sequence of seismic-trace data based on seismic wave reflections and/or refractions that have traveled over essentially the same path and therefore have approximately the same travel times. The process of adding such seismic-trace data together for improving the signal-to-noise ratio of the composite seismic-trace recording is known as "compositing" or "vertical stacking." It should be distinguished from "horizontal stacking," a process applied to a sequence of seismic-trace data based on seismic wave reflections from approximately the same subsurface point (referred to as the "common-depth point," or "CDP") but which has been generated and recorded at different surface locations. Horizontal stacking of CDP seismic-trace data requires that time corrections (called "normal moveout," or "NMO," corrections) be applied before the traces are summed together, since travel times from seismic source to detector are unequal for each trace in the sequence. While this invention could be applied in either process, it is primarily intended to improve the vertical stacking process.

In connection with the earlier mentioned swept frequency operation of vibroseis seismic prospecting, it is common practice to vertically stack, or sum, the seismic-trace data from a series of initiations, sequential swept frequency operations, to produce a composite seismic-race recording for the purpose of improving the signal-to-noise ratio of the seismic-trace data, that is, the ratio of the seismic signal to the ambient noise. However, since the earliest days of vibroseis seismic prospecting, which is most economical when conducted along the existing road network there a large vehicle-mounted vibrator can be used, noise, and in particular, noise such as burst noise associated with road traffic, has been recognized to have a severe adverse effect on seismic-trace data quality. Unless the noise is somehow suppressed vis-a-vis the seismic signal, the ability to accurately map the subsurface formations is diminished.

Unfortunately, the commonly used technique described above of vertically stacking the seismic-trace data for the purpose of improving the signal-to-noise ratio have proven inadequate in the presence of burst noise which appears during vibroseis seismic prospecting. That is, the low instantaneous transduced signal level of detected seismic wave reflections and/or refractions in the case of vibroseis seismic prospecting requires there be a long vibrator "chirp" signal duration, either a single very long swept frequency "chirp" signal or, more likely, a shorter swept frequency "chirp" signal (10–20 seconds) repeated many times. However, during the swept frequency operation, a large burst of noise will swamp the low instantaneous transduced signal level of detected seismic wave reflections and/or refractions and if digitized and vertically stacked will render the seismic-trace data unstable. The longer the duration or the greater the number of repetitions of the swept frequency "chirp" signal, the greater the risk of exposure to such fatal bursts of noise, although the noise becomes less and less predominant, that is, the noise will tend to "stack out," as the number of repetitions is increased or the duration is extended.

Interestingly, early analog field recording had such limited dynamic range that the noise bursts saturated the recording medium, whereby the noise was moderated to the extent that the recording was not necessarily rendered unusable. Digital field recording, on the other hand, with a cableless seismic digital recording system, such as the one disclosed in Weinstein et al. U.S. Pat. No. 3,946,357, records such noise bursts faithfully, thereby rendering the recording unusable. There is a need to improve the signal-to-noise ratio of seismic-trace data collected by digital field recording during seismic prospecting with a low energy surface seismic source in a noisy environment, particularly where burst noise appears.

The following provides a more detailed analysis of known approaches which involve vertical stacking for improving the signal-to-noise ratio of seismic-trace data. Let the j-th digitized sample of the i-th seismic-trace signal $(X_{i,j})$ in a sequence which is to be vertically stacked be represented by:

$$X_{i,j} = \alpha_i(\sigma_{i,j} + \eta_{i,j}) \qquad (1)$$

where $\sigma_{i,j}$ is the seismic signal, $\eta_{i,j}$ is the noise, and $\alpha_i$ is a scale factor (scalar) corresponding to seismic source and/or detector earth coupling and recorder amplifier gain variations.

The assumptions can be made that the seismic signal embedded in each trace is coherent and in phase (correlated) and that the noise is random and incoherent (uncorrelated) with zero mean value. Under such assumptions, the square value (variance) of any N-sample time "window", or portion, of the i-th trace is:

$$\sum_{j=1}^{N}(X_{i,j})^2 = \alpha_i^2 \sum_{j=1}^{N}(\sigma_{i,j})^2 + \qquad (2)$$

$$2\alpha_i^2 \sum_{j=1}^{N} \sigma_{i,j}\eta_{i,j} + \alpha_i^2 \sum_{j=1}^{N}(\eta_{i,j})^2$$

Since the noise is uncorrelated with the signal, the expected value of the middle term in Equation (2) is zero. In practice, the value is small and therefore can be neglected, resulting in:

$$\sum_{j=1}^{N}(X_{i,j})^2 = s_i^2 + n_i^2 = n_i^2(1 + \gamma_i) \qquad (3)$$

where $s_i^2$ and $n_i^2$ are the received seismic signal and noise variances, respectively, and $\gamma_i$ is the signal-to-noise power ratio of the i-th trace.

In general, the objective of vertical stacking is to maximize the signal-to-noise ratio of the resultant recording. To accomplish that objective, each seismic-trace signal sample is multiplied by a weighting function or scalar and mounted with the other similarly weighted samples in the M-trace sequence. The j-th sample of the vertically stacked recording is then represented by:

$$Y_j = \sum_{i=1}^{M} \beta_i X_{i,j} \qquad (4)$$

where $\beta_i$ is the weighting function or scalar, and the signal-to-noise power ratio of the vertically stacked recording is:

$$\gamma = \left(\sum_{i=1}^{M} \beta_i s_i\right)^2 / \left(\sum_{i=1}^{M} \beta_i^2 n_i^2\right) \qquad (5)$$

In order to determine the optimum weighting values which maximize the signal-to-noise power ratio, the partial derivative of $\gamma$ with respect to $\beta_i$ in Equation (5) is equated to zero. The result of this operation after some simplification is:

$$\beta_K n_K^2/s_K = \left(\sum_{i=1}^{M} \beta_i^2 n_i^2\right) / \left(\sum_{i=1}^{M} \beta_i s_i\right) \qquad (6)$$

The right-hand side of Equation (6) is a constant. Consequently, the optimum weighting value for the i-th trace is:

$$\beta_i^* c s_i/n_i^2 = c\gamma_i/s_i \qquad (7)$$

where c is an arbitrary constant.

In order to maximize $\gamma$, Equation (7) requires that each seismic-trace signal sample be weighted in proportion to its seismic signal amplitude and inversely to its noise power. Substituting this requirement into Equation (5) yields:

$$\gamma^* = \sum_{i=1}^{M} s_i^2/n_i^2 = \sum_{i=1}^{M} \gamma_i \qquad (8)$$

which implies that, under optimum weighting, the signal-to-noise power ratio of the optimum vertically stacked recording is equal to the sum of the signal-to-noise power ratios of the seismic-trace signals.

While Equation (7) is mathematically exact under the assumptions of coherent, in-phase seismic signal and random incoherent noise, computation of the optimum weighting value requires statistical estimation of $s_i$ and $n_i^2$, or $s_i$ and $\gamma_i$. Among others, Robinson, "Statistically Optimal Stacking of Seismic Data," *Geophysics*, June, 1970, proposes and evaluates schemes for determining these statistical estimates through auto-correlations and cross-correlations of the seismic-trace signals. Such schemes require considerable computer execution time and memory storage, thereby rendering them impractical and uneconomical in field recording environments.

However, Robinson's application to synthetic and actual field seismic-trace data demonstrates that while a maximum signal-to-noise ratio of the vertically stacked seismic-trace data is achieved when statistical estimates of $s_i$ and $n_i^2$ are available, sufficiently improved results are possible with approximations. The approximations relate only to the manner in which the weighting values are determined.

The simplest approximation occurs when $s_i$ and $n_i^2$ are the same for all seismic-trace signals. In this case, Equation (7) reduces to $\beta_i^* = c$, and computation of relative weighting values is not required. If $s_i$ and $n_i^2$ are constant, then so too is $\gamma_i$. Therefore, the signal-to-noise power ratio improvement in the vertically stacked recording is simply $\gamma^* = M\gamma$ where $\gamma$ is the signal-to-noise power ratio of the seismic-trace signals. Also, note that the signal-to-noise amplitude ratio is improved by a factor of $\sqrt{M}$. This approximation, often referred to as "true amplitude" summation, is implemented in various commercially available digital field recorders.

However, consider several repetitions of a swept frequency "chirp" signal at each of a plurality of vibration points for providing a set of seismic-trace data from which the seismic signal is to be statistically estimated. Assume one recording within the set to be in the presence of very high burst noise. Because of the burst noise, true amplitude summation in fact gives an estimate of the noise, not the seismic signal, and, therefore, a simple addition of the seismic-trace data for the repetitions as disclosed in Weinstein et al. U.S. Pat. No. 3,946,357 would be dominated by the noise.

Another relatively simple approximation results when the assumption is made that $s_i$ is the same for all seismic-trace signals and that $n_i^2$ is approximately equal to the average absolute value of the i-th trace. Then, Equation (7) reduces to:

$$\beta_i^* \approx c / \left( \sum_{j=1}^{M} |X_{i,j}| \right) \tag{9}$$

This process is comparable to applying "digital AVC" to each trace before vertical stacking and is similar to mantissa-only, sign bit, and automatic gain control (AGC) recording implemented in various commercially available digital field recorders.

However, again consider several repetitions of a swept frequency "chirp" signal at each of a plurality of vibration points for providing a set of seismic-trace data from which the seismic signal is to be statistically estimated. Assume one recording within the set to be in the presence of very high burst noise. Assume also that the very noisy recording can be multiplied by a weight between one and zero. If, on the other hand, the weight is one, the result is true amplitude summation and, in such a case, the one noisy recording will overwhelm the others, the resulting estimate being that of noise only as indicated above. In contrast, a factor less than one can be applied for weighting the very noisy recording so that the impact on the estimate is approximately the same as the less noisy recordings, which is the motivation for mantissa-only, sign bit, and AGC recording. Importantly, such features can be implemented on almost all field hardware inexpensively in a way which is time and trace variable (which is critical since noise is time and trace variable). However, mantissa-only and sign bit recording affect the seismic-trace data frequency content due to stepwise transitions in the digitized traces and thereby cause a loss of informational content. AGC recording does not generally result in a loss of informational content. However, AGC recording at best reduces the impact of the very noisy recording on the estimate only slightly, since the noise will dominate because there is no noise suppression within the recording, that is, the recording is virtually all noise. Hence, the noise is significant because the very noisy recording is accorded as the same contribution to the estimate as the less noisy recordings.

Embree U.S. Pat. No. 3,398,369 discloses an approximation known as "diversity stacking" which assumes that the seismic signal amplitude can be estimated from the total power in the "early" portion of the trace (that is, $s_i \approx \sqrt{\Sigma X_{i,j}^2}$) and the noise power from the total power in the "late" portion of the trace (that is, $n_i^2 \approx \Sigma X_{i,j}^2$). Equation (7) can then be estimated from the ratio of these seismic signal and noise power estimations under the assumption that $s_i$ is nearly the same for all seismic-trace signals and variations in the total power from one trace to the next for any given window are dominated by variations in noise. Accordingly, Equation (7) can be approximated by:

$$\beta_i^* \approx c / \left( \sum_{j=1}^{N} X_{i,j}^2 \right) \tag{10}$$

Implementation of diversity stacking consists of first partitioning each seismic-trace signal into a series of windows. Next, the total power in each window is computed, and the seismic-trace data is scaled by a window-wise linear function of the inverse of the power in that window and the power in the previous window. (It should be noted, in passing, that the calculation and application of weighting scale factors could also be accomplished over "moving windows;" such a scheme, however, would require more computational complexity). Finally, the scaled seismic-trace data is algebraically summed and normalized prior to recording. The normalization scale factors are inversely proportional to the sum of the weighting scale factors on a per window basis.

Diversity stacking is time variable depending on the length of the portion of the recording on which the weighting scale factor is based. This process is implemented in various commercially available digital field recorders and has been used for reducing burst noise in vibroseis seismic prospecting recordings.

Nevertheless, in some commercially available digital field recorders wherein diversity stacking has been implemented, the weighting scale factors are limited by:

$$\beta_i^* = \begin{cases} c_1 / \left( \sum_{j=1}^{N} X_{i,j}^2 \right) & \text{for } \epsilon_1 > \left( \sum_{j=1}^{N} X_{i,j}^2 \right) > \epsilon_2 \\ c_2 & \text{for } \left( \sum_{j=1}^{N} X_{i,j}^2 \right) < \epsilon_2 \\ c_3 & \text{for } \left( \sum_{j=1}^{N} X_{i,j}^2 \right) > \epsilon_1 \end{cases} \quad (11)$$

where $c_1$, $c_2$, $c_3$, $\epsilon_1$, and $\epsilon_2$ are constants and comparative limits. This reduces the chance that a near-zero seismic-trace signal will dominate the vertically stacked recording and at the same time allows a high-noise trace to be "muted" or "blanked."

However, diversity stacking disclosed in Embree U.S. Pat. No. 3,398,396 is based on the assumption that the magnitude of the noise on each recording is calculable so that the exact weighting scale factor can be calculated for each recording at a given vibration point that will maximize the signal-to-noise ratio. (The weighting scale factor is the inverse square of the noise amplitude.) Unfortunately, one does not know the relative amplitude of the noise on each recording. One only knows the amplitude of the noise plus the seismic signal.

In any event, diversity stacking has been found to have various limitations. One limitation is that the use of diversity stacking does not yield an optimum signal-to-noise ratio in circumstances where the level of the seismic signal is comparable in magnitude to the noise. Since the seismic signal, which includes components such as ground roll and refractions, is often comparable in magnitude to burst noise which appears during vibroseis seismic prospecting, diversity stacking does not always provide adequate noise suppression is noisy vibroseis seismic prospecting. Another limitation of diversity stacking is the difficulty and complexity of implementation in field hardware.

A co-pending patent application of Smith et al. Ser. No. 454,403 filed on the same date as this application and assigned to a common assignee and hereby incorporated by reference into this specification to form a part thereof discloses that the mean of exponents higher than two of the samples in a window can improve the signal-to-noise ratio in the presence of severe noise. That application proposes that Equation (7) be approximated by:

$$\beta_i^* \approx c / \left( \sum_{j=1}^{N} |X_{i,j}|^m \right) \quad (12)$$

which reduces to Equation (10) when $m=2$. For higher exponents ($m>2$), criteria can be set for determining noise suppression. However, consideration must be given to assure against "overflow" and/or "underflow" of memory words during weighting value calculation and application. That is, as higher and higher exponents are selected, the greater and greater is the dynamic range requirement of the data processing means for performing the weighting function. The dynamic range requirement imposes a limitation on the size of the exponent.

Reject recording is implemented in some commercially available digital field recorders. Reject recording causes a weighting scale factor of zero to be applied if a predetermined threshold is reached. The effect of reject recording is that noisy recordings are eliminated, that is, rejected. However, reject recording affects the seismic-trace data frequency content and thereby causes a loss of informational content, and furthermore, the required adjustments of threshold for producing such rejection have proven difficult to carry out in the field. Reject recording is dependent upon predetermined selection of threshold, which, if improperly selected, can, on the one hand, completely eliminate all seismic signals or, on the other hand, fail to reject any noise. There are two limitations associated with using commercially available digital field recorders which include a thresholding noise rejector. First, the threshold is based only on the signal level from one channel (usually one of the near channels) and, therefore, degrades performance when applied to other channels where the threshold may need to be set differently. Secondly, in some prospect areas where burst noise is always present, and a quiet recording cannot be obtained, it becomes difficult, if not impossible, to determine a threshold to be used.

Other noise suppression schemes have been proposed which are independent of weighting prior to vertical stacking. Examples of such schemes are disclosed in Schmitt U.S. Pat. No. 3,744,019 and Siems U.S. Pat. No. 3,894,222, for instance.

The approximation techniques mentioned above do not require precise statistical estimation of $s_i$ and $n_i^2$, yet they generally improve seismic-trace data quality by reducing the effects of ambient noise. However, they are characterized by computational complexity in determining and applying the weighting values. This is especially significant in digital field recorders where program storage, execution time, and electronic hardware size and power are extremely limited. This invention is directed to provide improvement of the signal-to-noise ratio which avoids the complexity and hardware limitations encountered in digital field recorders.

SUMMARY OF THE INVENTION

In accordance with the invention, methods and apparatus are provided for improving the signal-to-noise ratio of seismic-trace data in the presence of ambient noise, including burst noise, which appears during seismic prospecting with a low energy surface seismic source. Consequently, the noise is suppressed, and the seismic signal is emphasized.

The preferred method of the invention provides signal-to-noise improvement based on vertically stacking, that is, summing, inverse power weighted seismic-trace signals wherein the weighting value is equivalent to the inverse of the summed magnitudes of the instantaneous seismic-trace signal values taken to a selected exponent. (The magnitudes are first summed, and then the sum is raised to the exponent.) This is in contrast to the inverse power weighting and vertical stacking method disclosed in the aforementioned co-pending Smith et al. application wherein the magnitudes of the instantaneous seismic-trace signal values are first raised to the exponent and then a summation is performed.

The exponent used for weighing is selectable for improving the signal-to-noise ratio of the resultant composite seismic-trace signal as disclosed in the aforementioned co-pending Smith et al. application. The range of exponents provided is correlated to produce suppression of ambient noise within the range of ambient noise, including burst noise, commonly encountered during seismic prospecting with a low energy surface seismic source. The exponents preferably include zero, one, two, and four.

The preferred method of the invention for improving the signal-to-noise ratio of seismic-trace signals includes various steps for processing acquired incoming seismic-trace signals which correspond to the seismic wave reflections and/or refractions associated with seismic prospecting and detected by means of seismometers, or geophones. Based on the ratio of the expected level of seismic signal and the expected level of ambient noise which appears during seismic prospecting, such as burst noise due to traffic which appears during vibroseis seismic prospecting, the step is performed of selecting at least one exponent for use in inverse power weighting the seismic-trace signals with the objective of improving the signal-to-noise ratio through the selection of the exponent which determines the weighting values. The preferred method of the invention then requires the steps of dividing each incoming seismic-trace signal into a series of component seismic-trace signals, each within a time window of a predetermined length, and calculating weighting values based on the selected exponent and applying them to the respective component seismic-trace signals. The weighting value for the window is the inverse of the summed magnitudes of the seismic-trace signal samples, which comprise the component seismic-trace signal within the window, taken to the selected exponent (the magnitudes are first summed, and then the sum is raised to the exponent), and the weighting value is then applied to each sample within the window. The weighting value is preferably scaled by dividing the calculated weighting value for the window by the number of seismic-trace signal samples within the window. Preferably, the weighting value for the window which is actually applied is based on a linear interpolation between the weighting value calculated for the previous window, if any, and the weighting value calculated for the current window. Finally, the preferred method of the invention includes the step of vertically stacking, that is, summing, the weighted component seismic-trace signals, thereby forming a composite seismic-trace signal. Preferably, the composite seismic-trace signal is normalized based on the sum of the weighting values for the seismic-trace signal samples prior to being recorded.

In accordance with a modified method of the invention, each seismic-trace signal sample is represented in scientific notation having a sample mantissa and an associated sample base raised to an exponent. The weighting value for the window is the inverse of the result determined by combining the selected exponent with the sample exponents for the seismic-trace signal samples which comprise the component seismic-trace signal within the window, and the weighting value is then applied to each sample within the window. The selected exponent and the sample exponents for the seismic-trace signal samples are preferably combined by multiplying the selected exponent by a value chosen from among the root mean square (RMS), average, and peak values of the sample base exponents for the seismic-trace signal samples within the window. The time window can be a moving time window of a predetermined length.

The methods of the invention provide significant advantages over signal-to-noise improvement techniques implemented in known digital field recorders. The methods of the invention facilitate implementation of a signal-to-noise improvement technique in a digital field recorder through reduction of complexity of computations and alleviate dynamic range limitations such that overflow and underflow conditions are avoided.

In accordance with a preferred embodiment of apparatus for implementing the methods of the invention whereby seismic-trace signals are inverse power weighted prior to being vertically stacked for improving the signal-to-noise ratio, an improved recorder is provided for a cableless seismic digital recording system. A coded signal is radioed by a control means to the recorder remotely deployed in a prospect area. The coded signal includes a code for selecting the appropriate exponent used in the methods of the invention for improving the signal-to-noise ratio.

The recorder of the invention exhibits significant advantages over commercially available digital field recorders. There is not thresholding required in order to suppress noise. Furthermore, the recorder achieves the added advantage of being able to suppress noise without sacrificing the advantages of a cableless seismic digital recording system, which is characterized by a relatively low level of such noise at 60 Hz line pickup and by the absence of channel cross-talk which occurs in the master cable of conventional seismic digital recording systems.

BRIEF DESCRIPTION OF THE DRAWINGS

The above and other features of this invention and a better understanding of the principles and details of the invention will be evident to those skilled in the art in view of the following description of the preferred embodiments given in conjunction with the accompanying drawings, in which:

FIG. 5, comprising

DESCRIPTION OF THE PREFERRED EMBODIMENTS

Figure 1:
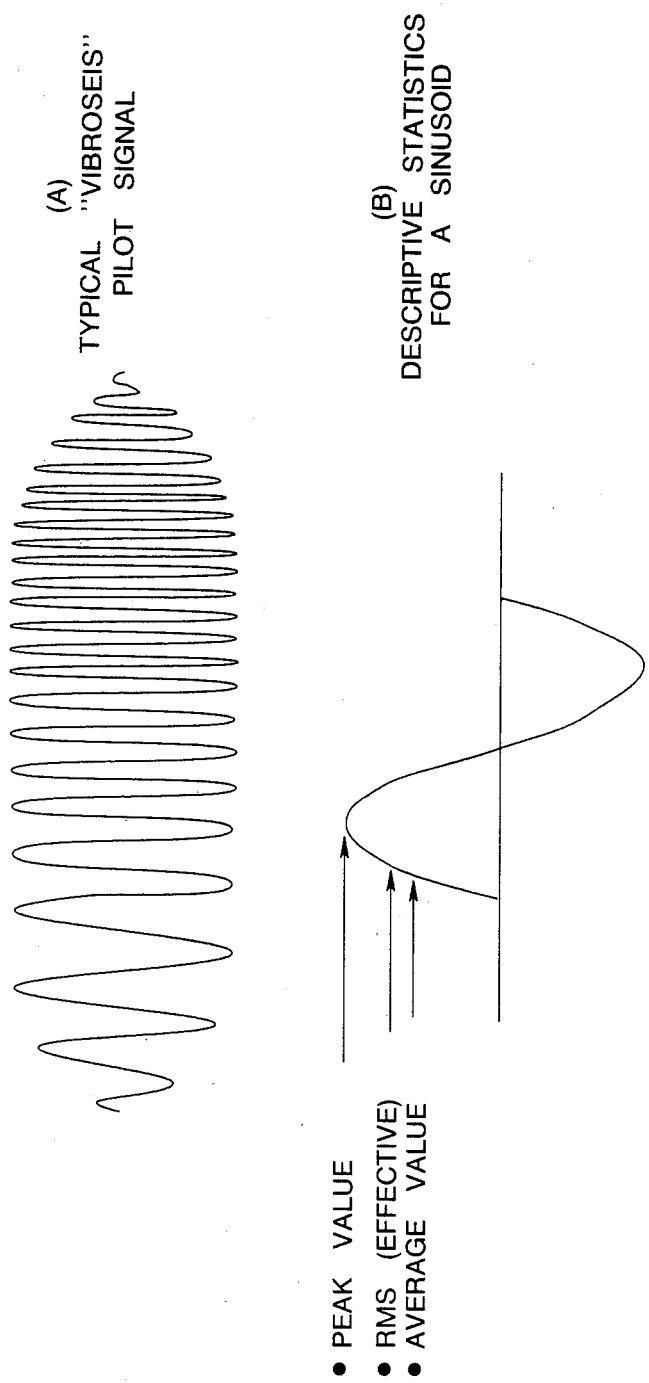
FIG. 1A illustrates a wave form encountered in connection with vibroseis seismic prospecting.
FIG. 1B illustrates the characteristics of a sinusoid.

A typical vibroseis pilot signal is shown in FIG. 1A. Attenuated and reflected replicas of the pilot signal are recorded at and/or near the surface of the earth for each subsurface formation discontinuity. In general, recorded vibroseis seismic-trace data comrises complex wavetrains consisting of sinusoids plus noise.

The vibroseis seismic-trace data quality is improved by reducing ambient noise, including burst noise caused by wind, traffic, and so forth. Diversity stacking described above has been shown to produce results which are superior to unweighted true amplitude summation; but calculation of the weighting scale factors in accordance with Equation (10) for diversity stacking is laborious and time-consuming. Even greater computational complexity is required when weighting values are calculated in accordance with Equation (12) as disclosed in the aforementioned co-pending Smith et al. application where $m \leq 2$. Recognizing that vibroseis seismic-trace data is basically composed of sinusoids, in accordance with the present invention a more computationally efficient method has been derived as follows.

The RMS (effective) value of a sinusoid is only slightly greater than its average value as shown in FIG. 1B. In fact, the two values are related to one another by a constant, since the RMS value is $1\sqrt{2}$ times the peak and the average value is $2/\pi$ times the peak. While this relationship is not exact for complex wave-trains, it has been found to be a reasonable approximation.

Therefore, rather than compute the mean of the seismic-trace signal samples raised to the m-th power as in Equation (12), in accordance with the preferred method of the invention the m-th power of the mean of the absolute values is computed according to:

$$\beta_i^* \approx c / \left( \sum_{j=1}^{N} |X_{i,j}| \right)^m \quad (13)$$

where c can be adjusted to account for the relationship between the RMS and average values of a sinusoid. Equations (12) and (13) are not mathematically equivalent but nevertheless provide similar improvements in the signal-to-noise ratio of the seismic-trace data.

Equations (12) and (13) are identical when $m=0$ or $m=1$. In the case of higher exponents, Equation (13) effectively takes the m-th power of the weighting values determined with the exponent of one. Weighting values for higher exponents, such as two and four, are calculated much more simply and faster with Equation (13) than with Equation (12), since Equation (13) requires only $(m-1)$ multiplications and N additions per window while Equation (12) requires $N(m-1)$ multiplications and N additions per window. Hence, for $N>>(m-1)$, Equation (13) reduces program storage and increases computation speed and provides considerable savings in execution time.

Figure 2:
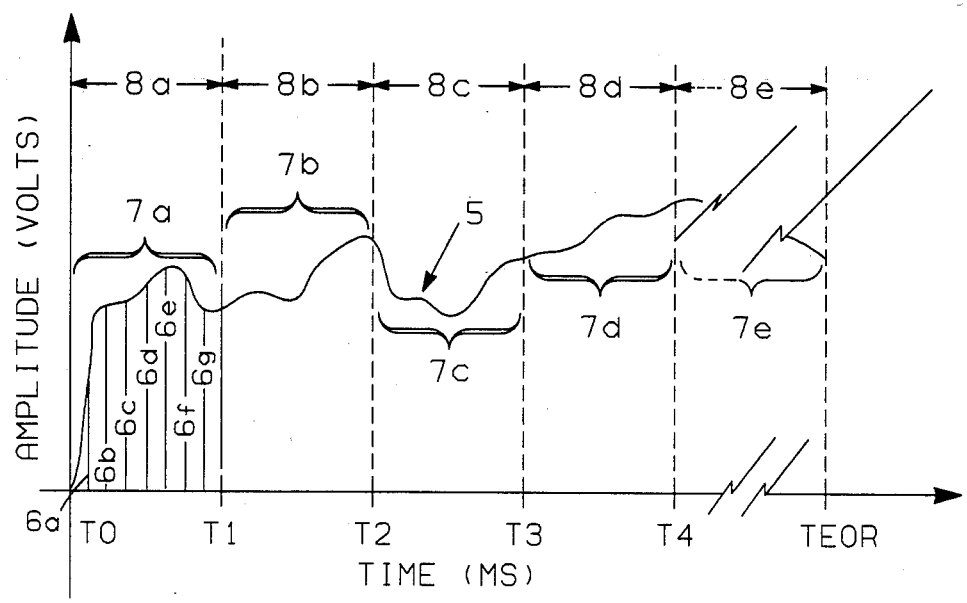
FIG. 2 shows a seismic-trace signal to be inverse power weighted and vertically stacked in accordance with the methods of the invention.

In accordance with the preferred inverse power weighting and vertical stacking method of the invention, as shown in FIG. 2, each incoming seismic-trace signal 5 from a seismometer, or geophone, is sampled at a predetermined sampling frequency, and the samples, such as samples 6a-6g, are digitized. The incoming seismic-trace signal 5 comprises one trace and is the result of one initiation of a low energy surface seismic source, for example, one sweep of a vibrator. The sampling frequency can be 500 Hz, for example, which means that the incoming seismic-trace signal 5 is sampled every two milliseconds. Furthermore, each incoming seismic-trace signal 5 is divided into a series of component seismic-trace signals 7a-7e within respective windows 8a-8e. The period of each of the windows 8a-8e (T1-T0, T2-T1, etc.) must be sufficiently long in order to assure a statistically reliable estimate of the signal-plus-noise level, half a second, for example. The assumption is made that if the energy within the incoming seismic-trace signal 5 varies from trace to trace for any given window, the variation is primarily due to noise rather than the seismic signal. Hence, a weighting value is applied to the incoming seismic-trace signal samples within a window based on the inverse of the summed magnitudes of the incoming seismic-trace signal samples in that window taken to a selected exponent.

A weighting value is initially calculated for the window under consideration, such as the window 8a. The weighting value is the inverse of the summed magnitudes of the incoming seismic-trace signal samples 6a-6g, which comprise the component seismic-trace signal 7a within the window 8a, taken to the selected exponent. The weighting value is preferably scaled by dividing the calculated weighting value for the window by the number of seismic-trace signal samples within the window. The weighting value is then applied to each of the incoming seismic-trace signal samples in the window.

During the first window, such as the window 8a, a constant weighting value is applied, since there is no weight for a previous window on which to base a weighting value. For each of the successive windows, such as the windows 8b-8e, a weighting value is again calculated as the inverse of the summed magnitudes of the incoming seismic-trace signal samples, which comprise the component seismic-trace signal in the respective window, taken to the selected exponent. However, over each of the successive windows 8b-8e, a linear interpolation is preferably made between the calculated weighting value of the previous window and the calculated weighting value of the current window in order to assure continuity of seismic-trace data. As the individual incoming seismic-trace signal samples which comprise the component seismic-trace signal within each of the successive windows 8b-8e are weighted, the weighting value is interpolated between the calculated weighting value of the previous window and the calculated weighting value of the current window.

The inverse power weighted seismic-trace signal samples produced in response to the current incoming seismic-trace signal are then vertically stacked, that is, summed, with the "corresponding" inverse power weighted seismic-trace signal samples of previous seismic-trace signals. By corresponding is meant the seismic-trace signal samples obtained during sampling at corresponding times with respect to the plural initiations of the seismic source, for example, with reference to T0 in FIG. 2. The end result is a composite seismic-trace signal. Preferably, the composite seismic-trace signal is normalized prior to recording by dividing respective weighted and vertically stacked seismic-trace signal samples by the sum of the weighting values applied in the inverse power weighting of the respective seismic-trace signal samples.

It is assumed for simplicity that the time indices for the current window under consideration range from 1 to N and that the time indices for the previous window range from $(1-N)$ to 0. Then, from Equation (4), we have the preferred method of the invention for vertically stacking inverse power weighted seismic-trace signals, wherein the average of the magnitudes of the incoming seismic-trace signal samples is raised to the selected exponent and the inverse of the result, after being scaled by the sum of the weighting values, comprises the end points for the linearly interpolated weighting value, given by the following mathematical expression, hereinafter referred to as Equation (14):

$$Y_j = \sum_{i=1}^{M} \beta_i X_{i,j} \quad (14)$$

-continued where: $C = \sum_{i=1}^{M} [p_1 + (p_2 - p_1)(j/M)]$

= linearly interpolated weighting value $$p_1 = \left[ \frac{1}{N} \sum_{j=0}^{1-N} |X_{i,j}| \right]^{-m}$$

= initial end point for linear interpolation $$p_2 = \left[ \frac{1}{N} \sum_{j=1}^{N} |X_{i,j}| \right]^{-m}$$

= final end point for linear interpolation $C = \beta_i = [p_1 + (p_2 - p_1)(j/M)]/C$ = normalization factor N = number of samples in window
M = number of traces in weighted stack
m = selected exponent.

Note that $p_1 = p_2$ for the first window (arbitrarily).

As shown in Equation (14), the step of inverse power weighting has an exponent m associated therewith. (In inverse power weighting, by power is meant exponent and not the kind of power associated with amplitude squared.) The exponent is selectable for improving the signal-to-noise ratio of the composite seismic-trace signal formed by inverse power weighting and vertically stacking, that is, summing, the incoming seismic-trace signals. Inverse power weighting exponents preferably include: exponent zero in which the weights are independent of the sample values and the vertically stacked result is equivalent to an unweighted floating-point sum; and exponent one in which the weights are inversely proportional to the average of the absolute sample values; and exponent two in which the weights are inversely proportional to the average of the sample values squared and the vertically stacked result is dominated by the lowest-energy seismic-trace signals; and exponent four in which the weights are inversely proportional to the average of the sample values to the fourth power and the vertically stacked result is dominated even more by the lowest-energy seismic-trace signals. Exponent zero is equivalent to true amplitude summation. Exponent one is equivalent to AGCing records before summation and can be compared to mantissa-only and sign bit recording. Exponent two is similar to diversity stacking. Higher exponents exhibit characteristics of a well adjusted reject recording.

In accordance with a preferred embodiment of the invention, recorder apparatus of the type disclosed in Broding et al. U.S. Pat. No. 3,806,864 is improved to include a seismic-trace data processing capability for vertically stacking inverse power weighted seismic-trace signals in accordance with Equation (14). The disclosure of Broding et al. U.S. Pat. No. 3,806,864 is hereby incorporated by reference into this specification to form a part thereof. The seismic-trace data processing capability is preferably implemented by the incorporation of a microcomputer means and a memory within the remotely deployed digital field recorder of the cableless seismic digital recording system disclosed in Broding et al. U.S. Pat. No. 3,806,864. Preferably, the recorder of the invention comprises cableless seismic digital recorder apparatus of the type disclosed in Broding et al. U.S. Pat. No. 3,806,864 wherein the logic circuitry disclosed in that patent (which controls the sequence of actions within the recorder apparatus) is replaced by microcomputer circuitry and memory circuitry for both controlling the recorder and processing seismic-trace data. (The power supply circuitry is altered also but forms no part of the invention.)

Figure 3:
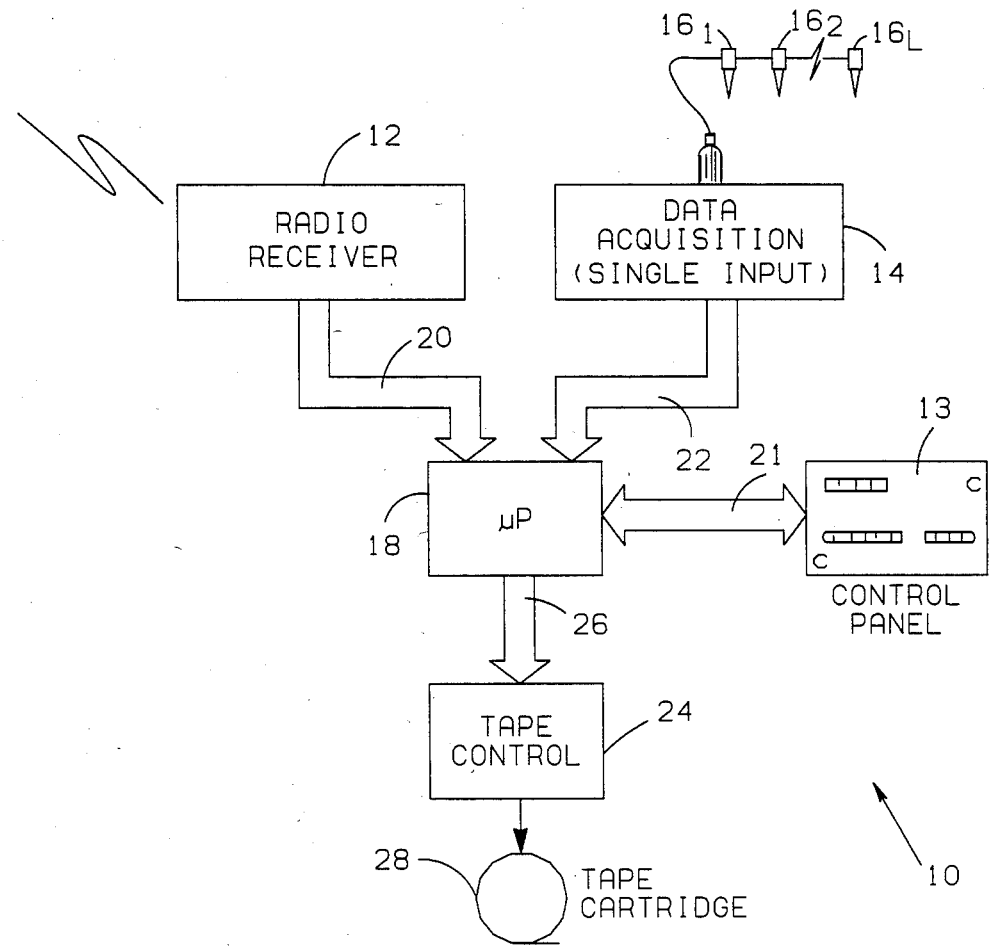
FIG. 3 is a block diagram of the preferred embodiment of the recorder of the invention.

As shown in FIG. 3, the preferred embodiment of the recorder of the invention, generally indicated by the numeral 10, includes a radio receiver circuit 12. The radio receiver circuit 12 is more fully described in a co-pending patent application of Read et al. (Ser. No. 454,405 et al.) filed on the same date as this application and assigned to a common assignee and hereby incorporated by reference into this specification to form a part thereof. The radio receiver circuit 12 receives coded signals radioed by a control means (not shown) which forms the subject of a co-pending patent application of Bogey et al. Ser. No. 454,402 also filed on the same date as this application and assigned to a common assignee and hereby incorporated by reference into this specification to form a part thereof. Among the coded signals which can be radioed is a code to inverse power weight and vertically stack seismic-trace signals as well as the exponent to be used for weighting which is selectable for improving the signal-to-noise ratio of the composite seismic-trace signal. Alternatively, the code to inverse power weight and vertically stack seismic-trace signals as well as the exponent to be used for weighting can be entered by means of a control panel 13.

The recorder 10 also includes an analog-to-digital converter circuit 14 which receives analog electrical seismic-trace signals from a group of seismometers, or geophones, $16_1$, $16_2$, . . . $16_L$ and digitizes the analog electrical seismic-trace signals. The analog-to-digital converter circuit 14 is more fully described in the aforementioned co-pending Read et al. application.

The recorder 10 further includes a microcomputer circuit 18 which receives coded signals from the radio receiver circuit 12 over a data bus 20 and/or the control panel 13 over a data bus 21 and also receives digitized seismic-trace signals from the analog-to-digital converter circuit 14 over another data bus 22. The microcomputer circuit 18 then performs the function of logic circuitry, as well as inverse power weighting and vertical stacking in its spare time by means of the instructions in the microcomputer's program. The features of the recorder 10 may be modified by simply changing the program of the microcomputer circuit 18 (within the limits of the hardware). The program written for the microcomputer circuit 18 to implement the preferred method of the invention for vertically stacking inverse power weighted seismic signals in accordance with Equation (14) will be described in more detail later in connection with FIG. 5.

Preferably, as shown in FIG. 3, a tape control circuit 24 receives the composite seismic-trace signal from the microcomputer circuit 18 over a data bus 26. The tape control circuit 24 then transfers the composite seismic-trace signal to a tape 28.

Generally, once the coded signals have been received by the radio receiver circuit 12 and it is determined that the recorder 10 is in the inverse power weighting and vertical stacking mode, a main program implemented in the microcomputer circuit 18 starts to read incoming seismic-trace signal samples from the analog-to-digital converter circuit 14 into a first window buffer memory.

When this buffer memory is full, the main program redirects the incoming seismic-trace signal samples into a second window buffer memory and gives control to an inverse power weighting and vertical stacking program. The program is then ready to weight and sum the first window into the stack.

Initially, the inverse power weighting and vertical stacking program calculates the weighting value for the window and then applies the calculated weighting value to each seismic-trace signal sample which comprises the component seismic-trace signal within the window. The incoming seismic-trace signal is separated into windows over which the respective weighting values are calculated. As indicated by Equation (14), the weighting value is the inverse of the summed magnitudes of the seismic-trace signal samples, which comprise the component seismic-trace signal within the window, taken to the selected exponent. The weighting value is preferably scaled by dividing the calculated weighting value for the window by the number of seismic-trace signal samples within the window.

During the first window of each incoming seismic-trace signal, a constant weighting value is applied, since there is no weight for a previous window on which to base a weighting value. For each of the successive windows, a weighting value is again calculated as the inverse of the summed magnitudes of the seismic-trace signal samples, which comprise the component seismic-trace signal within the respective window, taken to the selected exponent. Over each of the successive windows a linear interpolation is preferably made between the calculated weighting value of the previous window and the calculated weighting value of the current window in order to assure continuity of seismic-trace data. As the individual samples which comprise the component seismic-trace signal within each of the successive windows are weighted, the weighting value is interpolated between the calculated weighting value of the previous window and the calculated weighting value of the current window. The result of the current window is then summed with the accumulated results of corresponding earlier windows to form the composite seismic-trace signal.

Power is maintained on the microcomputer circuit 18 and memories between initiations of the seismic source in order to retain the accumulated sum of weighted seismic-trace signals. The accumulated sum of weighted seismic-trace signals is stored in a 32K-byte bulk random access memory included in the microcomputer circuit 18. Preferably, during the last sweep before the composite seismic-trace signal is recorded on the tape 28, the composite seismic-trace signal is normalized. The composite seismic-trace signal is preferably normalized by dividing respective weighted and vertically stacked seismic-trace signal samples by the sum of the weighting values applied in the inverse power weighting of the respective seismic-trace signal samples. Otherwise, the inverse power weighting and vertical stacking program waits for the next window buffer memory to become full. At the appropriate instruction, the bulk memory is recorded on the tape 28 as one composite seismic-trace signal, that is, as one inverse power weighted, vertically stacked seismic trace.

Inverse power weighting and vertical stacking is done in real time. That is, the average time to weight and sum one of the seismic-trace signal samples, which comprises the incoming seismic-trace signal, is less than the time required to input that sample from the analog-to-digital converter circuit 14. Hence, the inverse power weighting and vertical stacking program runs while analog-to-digital conversion and tape interrupts occur.

As higher and higher exponents are selected, the greater and greater can be the real-time requirement for execution of the inverse power weighting and vertical stacking program. In the preferred embodiment of the recorder 10, all calculations are performed on a real-time basis between the times that seismic-trace signal samples are read (on a buffered basis). Therefore, the execution time requirement must be shorter than the sampling rate, in the illustrated case two milliseconds.

The microcomputer circuit 18 is required to perform several sophisticated data processing techniques. In order to accomplish such data processing techniques, the basic data processing capabilities of an 1802 microprocessor manufactured by Motorola, Inc. were enhanced with a 9511 arithmetic processing unit manufactured by Advanced Micro Devices, Inc. as a preferred implementation of the microcomputer circuit 18.

The 9511 is a medium speed arithmetic processing unit. Use is made of the 9511 arithmetic processing unit during inverse power weighting and vertical stacking in accordance with Equation (14). The 9511 arithmetic processing unit works independently of the 1802 microprocessor and is treated as a peripheral device from the system's point of view.

Figure 4:
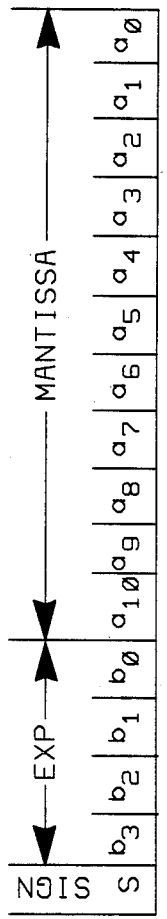
FIG. 4 shows the data format for the recorder of FIG. 3.
Figure 4:
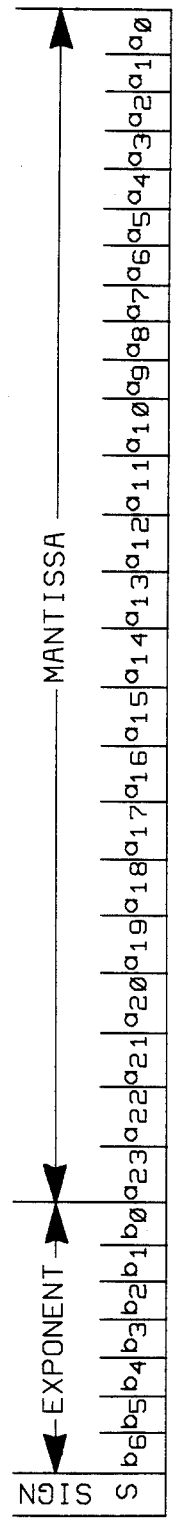

The user interface to the 9511 arithmetic processing unit includes access to an eight-level, 16-bit wide data stack. When using double precision fixed point or floating point data formats, the data stack can be thought of as a four-level, 32-bit wide stack. Data is entered onto the stack eight bits at a time with the least significant byte first. Data is removed from the stack in reverse byte order (most significant byte first). Data is entered onto the stack in multiples of the number of bytes appropriate to the chosen data format. The 16-bit input/output data format and 32-bit internal data format for trace multiplication and addition are shown in FIGS. 4A and 4B, respectively. The synchronization between the 1802 microprocessor and the 9511 arithmetic processing unit is made by sending the 9511 completion signal to an external flag of the 1802. A brief summary of the commands executed within the 9511 arithmetic processing unit for inverse power weighting and vertical stacking is given in Table 1.

TABLE 1

9511 Command Summary

| Command Mnemonic | Clock* Cycles | Command Description** |
|---|---|---|
| FADD | 56–350 | Adds TOS to NOS and Pop Stack |
| FSUB | 58–352 | Subtracts TOS from NOS and Pop |
| FMUL | 168 | Multiplies NOS by TOS and Pop |
| FDIV | 171 | Divides NOS by TOS and Pop |
| EXP | 4616 | Exponential of TOS |
| FLTS | 98–186 | Convert Single TOS to Floating |
| PTOF | 20 | Push Floating Pt. TOS to NOS (roll down) |
| POPF | 12 | Pop Floating Pt. from TOS (roll up) |
| XCHS | 18 | Exchange Single TOS and NOS |
| XCHF | 26 | Exchange Floating Pt. TOS and NOS |

*The clock is 3 MHz.
**NOS and TOS stand for "Next on Stack" and "Top of Stack."

Figure 5A:
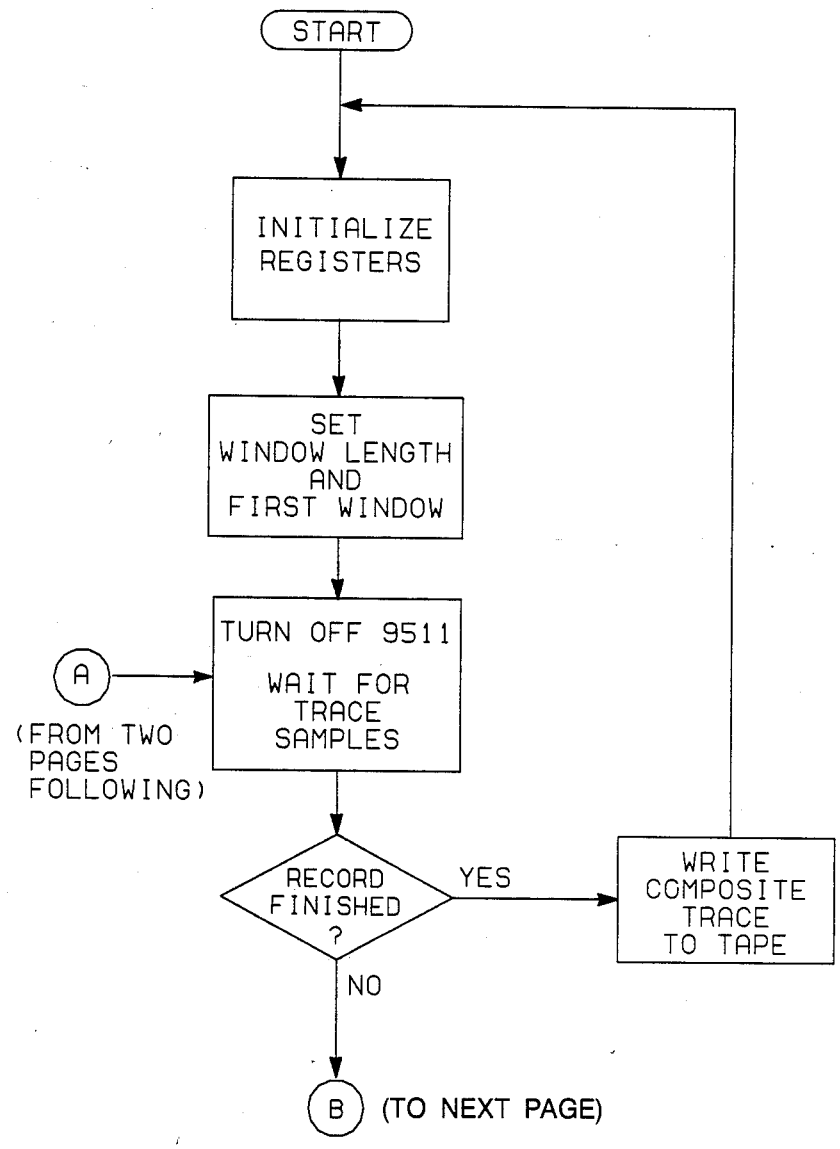
FIGS. 5A through 5K, is a flow chart which illustrates how the recorder of FIG. 3 performs the preferred inverse power weighting and vertical stacking method of the invention.
Figure 5B:
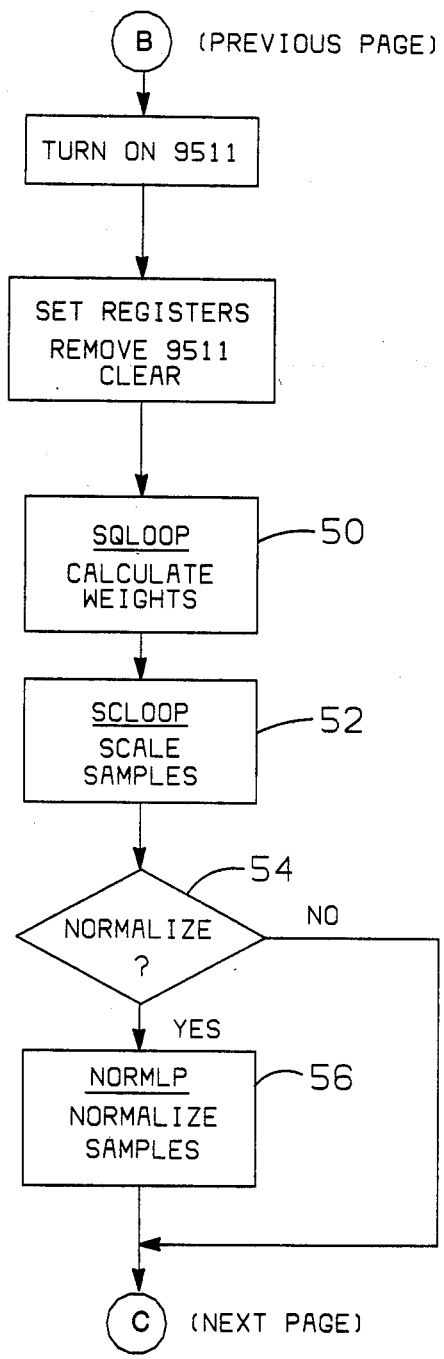
Figure 5C:
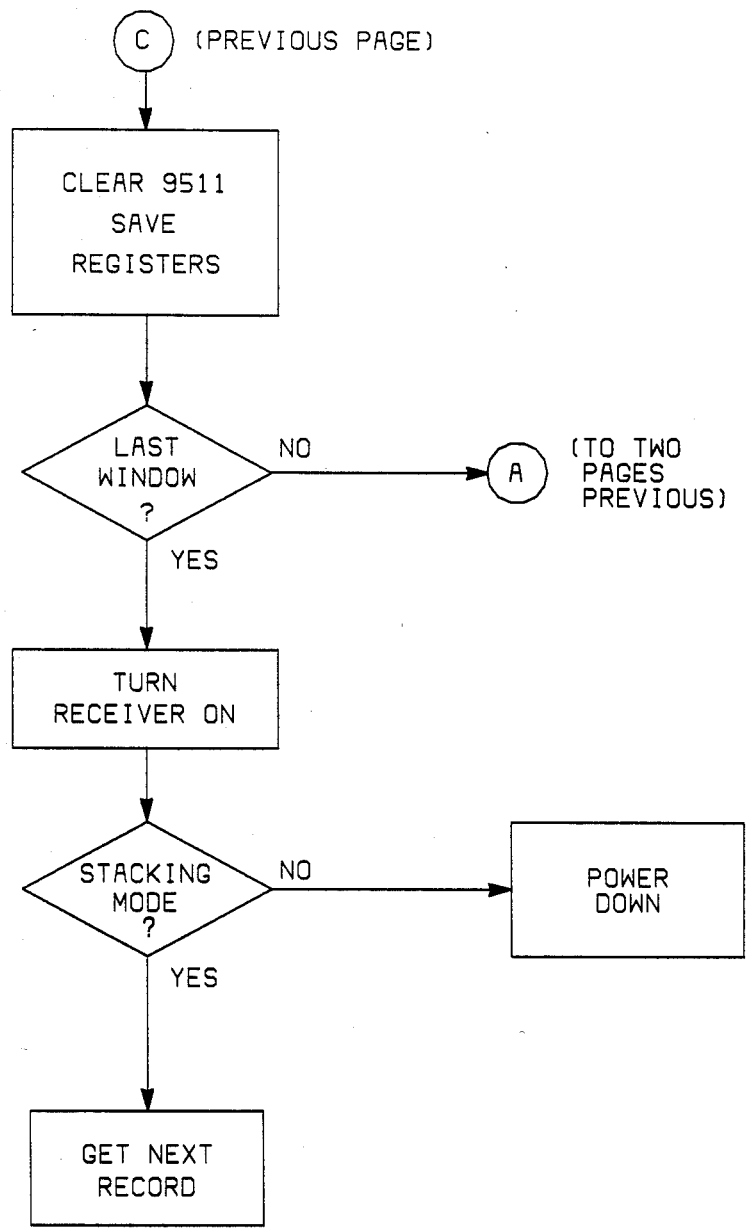

FIGS. 5A through 5K illustrate a flow chart of the preferred inverse power weighting and vertical stacking method of the invention as implemented by means of the 1802 microprocessor and the 9511 arithmetic processing unit. FIGS. 5A through 5C show the steps executed by the 1802 microprocessor in connection with inverse power weighting and vertical stacking seismic-trace signals. The steps executed by the 9511 arithmetic processing unit for calculating and applying the weighting values to the seismic-trace signals and vertically stacking the weighted signals in order to produce a composite seismic-trace signal appear in FIGS. 5D through 5K.

Considered in more detail, the 1802 microprocessor calls the 9511 arithmetic processing unit at step 50 in FIG. 5B, and the 9511 executes the program instructions needed to carry out the steps 50, 52, 54, and 56 in FIG. 5B. FIGS. 5D through 5K illustrate the steps 50, 52, 54, and 56 in detail and provide a picture of the 9511 arithmetic processing unit data stack, or registers, and the data contained in the stack as each step is executed by the 9511.

When the recorder 10 is radioed in the inverse power weighting and vertical stacking mode (selectable from the radio control means, not shown), power is constantly maintained (controlled by a stack flag) to preserve the composite seismic-trace signal. When first initiated, the stack flag is set, and the inverse power weighting and vertical stacking program is initialized. The incoming seismic-trace signal samples are then inverse power weighted and vertically stacked as shown in FIGS. 5A through 5K. When normalization is called for, the last incoming seismic-trace signal samples are inverse power weighted and vertically stacked, normalization is performed, and a first flag is set to indicate the composite seismic-trace signal is normalized. The composite seismic-trace signal is held and then recorded on the tape 28 as the next sequence of initiations of the seismic source begins and the first incoming seismic-trace signal of the next sequence is read. The recording of data, that is, the composite seismic-trace signal, on the tape 28 and initialization of a new record occur whenever the record has been previously normalized (as indicated by the first flag). Whenever a nontest call is made and the recorder 10 is not radioed by the radio control means (not shown), the composite seismic-trace signal is recorded on the tape 28 (if it had been normalized), and the recorder is then powered down. Whenever the recorder 10 is powered down, the stack flag is reset, and first flag is set.

The seismic-trace signal samples are in the data format shown in FIG. 4B. That is, each seismic-trace signal sample is represented by:

$$X_{i,j} = A_{i,j} \cdot B^{R_{i,j}} \tag{15}$$

where $A_{i,j}$ is the mantissa, B is the base, and $R_{i,j}$ is the exponent.

A modified method in accordance with the invention has been derived by recognizing that inverse power weighting and vertical stacking is primarily effective in suppressing ambient noise, such as burst noise, and the information required to accomplish this noise suppression is mainly carried in the seismic-trace signal samples' exponents. The mantissas add little information to the weighting values determined in accordance with Equation (13) since $0 \leq A_{i,j} \leq 1$. The exponents of the seismic-trace signal samples, on the other hand, directly represent the incoming seismic-trace signal amplitude and indicate the presence of unwanted noise bursts.

Using the law of exponents, in accordance with the modified method of the invention the weighting values can therefore be approximated by:

$$\beta_i^* \approx c/B^{R^*m} = cB^{-R^*m} \tag{16}$$

where c is an arbitrary constant, $R^*$ is the calculated RMS, average, or peak value of the seismic-trace signal samples' exponents in a given window, and m is the selected exponent. (The window can be a moving window of a predetermined length.)

Figure 6:
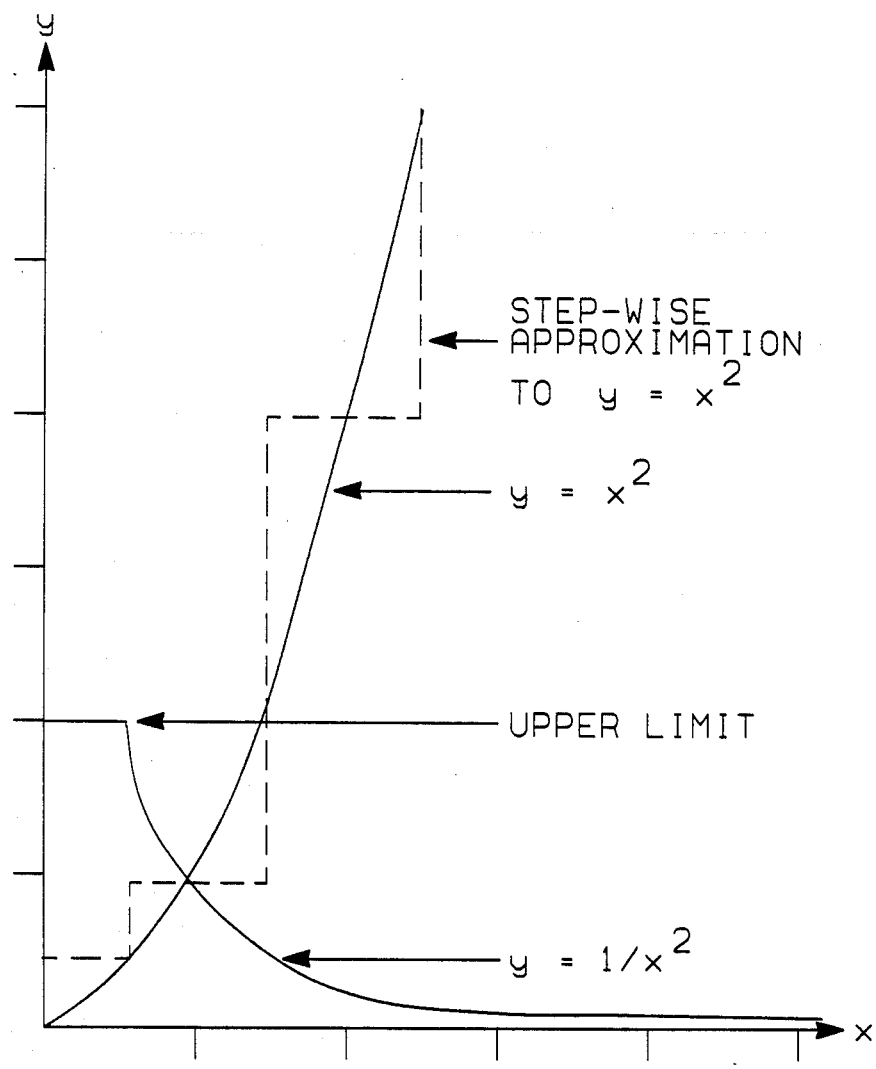
FIG. 6 is a graph of the weighting function in accordance with the modified method of the invention.

The modified method of the invention is easily implemented since it requires no multiplications or divisions (that is, $\beta_i X_{i,j} = A_{i,j} \cdot B^{R_{i,j} - R^*m}$ where $\beta_i = \beta_i^*/c$). In Equation (14) the weighting value becomes:

$$\beta_i = B^{-R^*m} \tag{17}$$

where B is the base in which the seismic-trace signal samples are expressed, $R^*$ is chosen from among the RMS, average, and peak values of the seismic-trace signal samples' exponents, and m is the selected exponent. For m=2, the resulting weighting function is a step-wise approximation to a quadratic as shown in FIG. 6.

As higher and higher exponents are selected, the greater and greater is the dynamic range requirement of the data processing hardware for execution of the inverse power weighting and vertical stacking program. Therefore, the dynamic range requirement of the hardware can impose a constraint on the size of the exponent. For example, based on the 1802 microprocessor and the 9511 arithmetic processing unit wherein B=2, a limitation of $0 \leq R_{i,j} \leq 15$ is acceptable, and for B=4, $0 \leq R_{i,j} \leq 7$. An upper limit for the weighting function can be used to assure that extremely low level seismic-trace signals do not dominate the stack.

The modified method of the invention produces noise suppression similar to the noise suppression disclosed in Siems U.S. Pat. No. 3,894,222. It also produces noise suppression comparable to mantissa-only and sign bit recording.

Figure 5D:
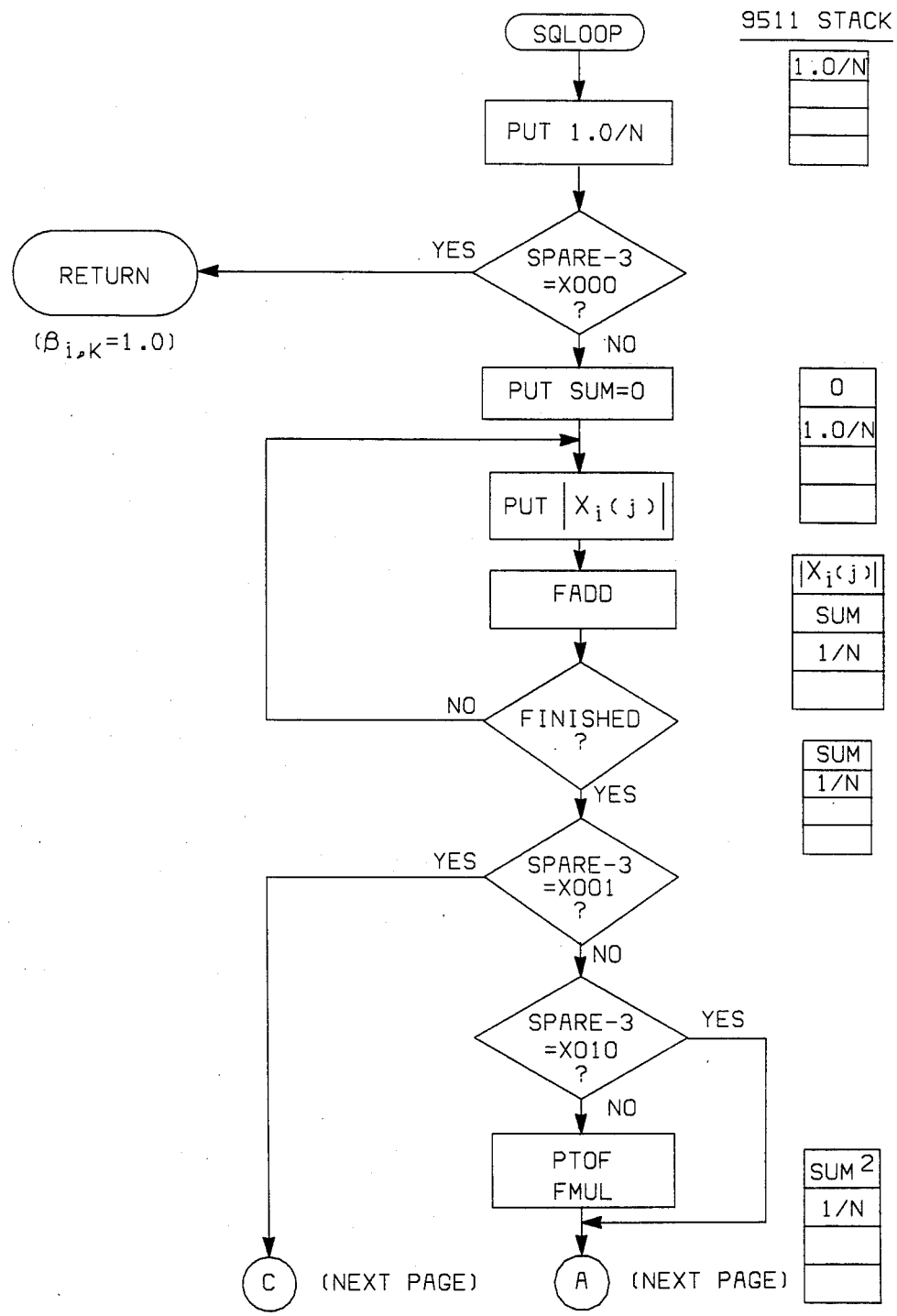
Figure 5E:
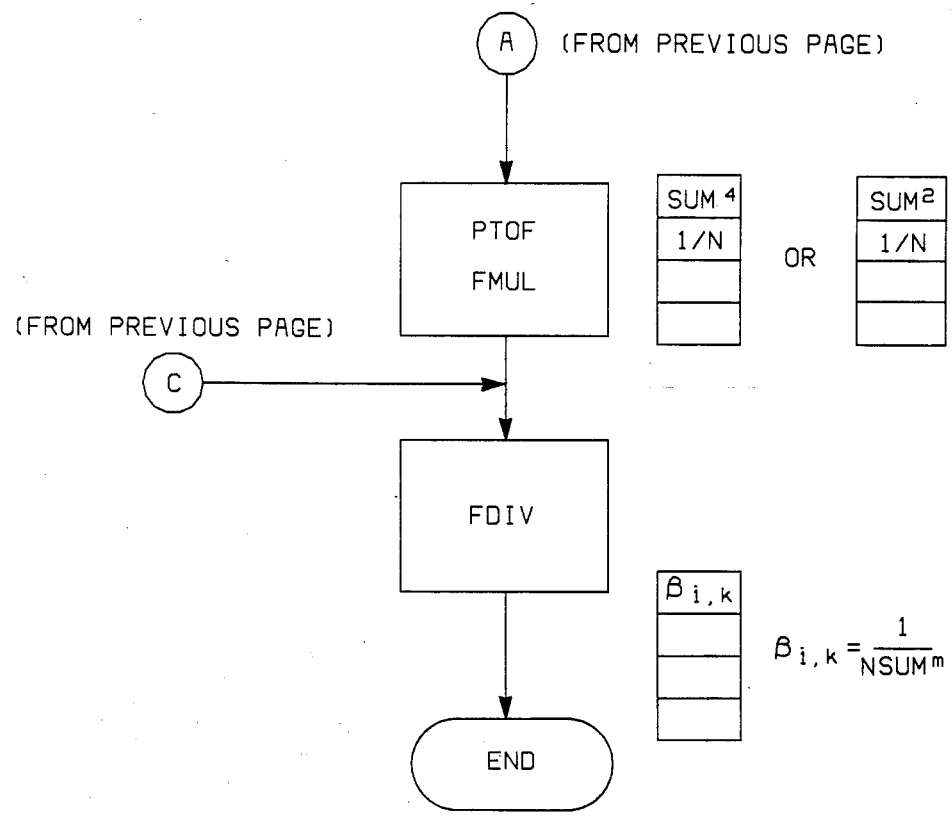
Figure 5F:
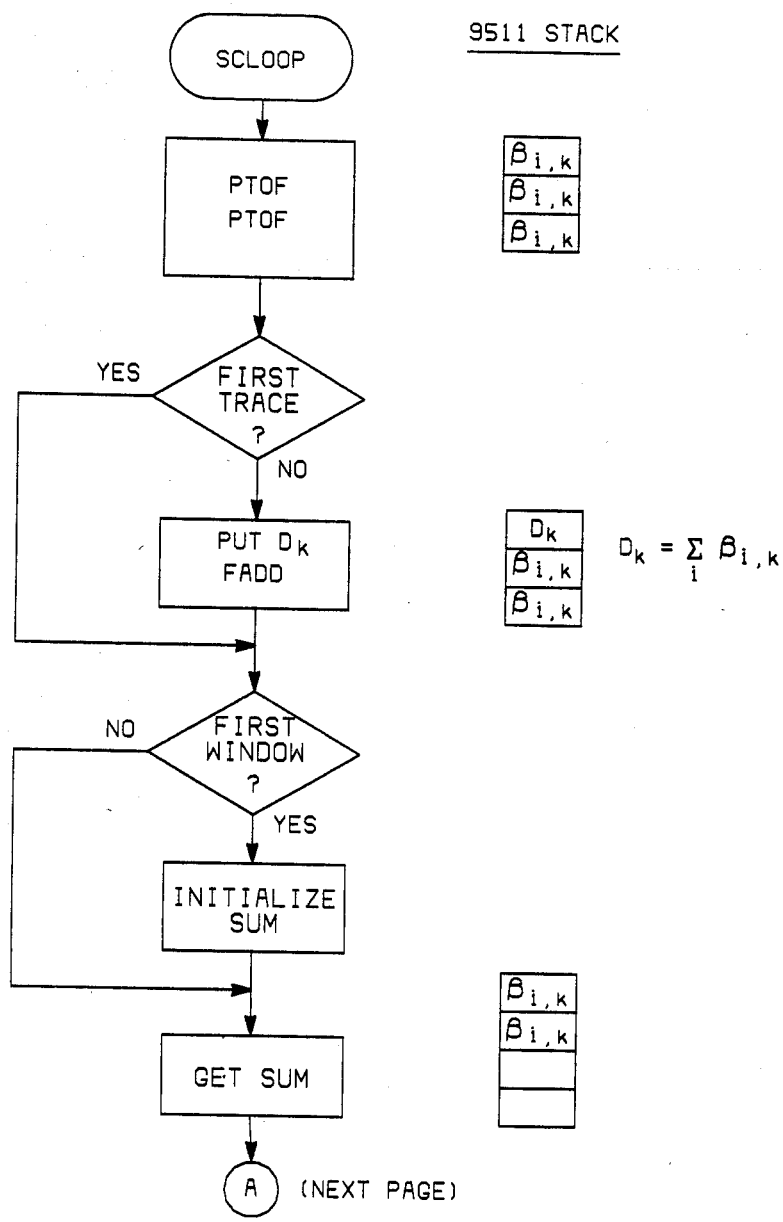
Figure 5G:
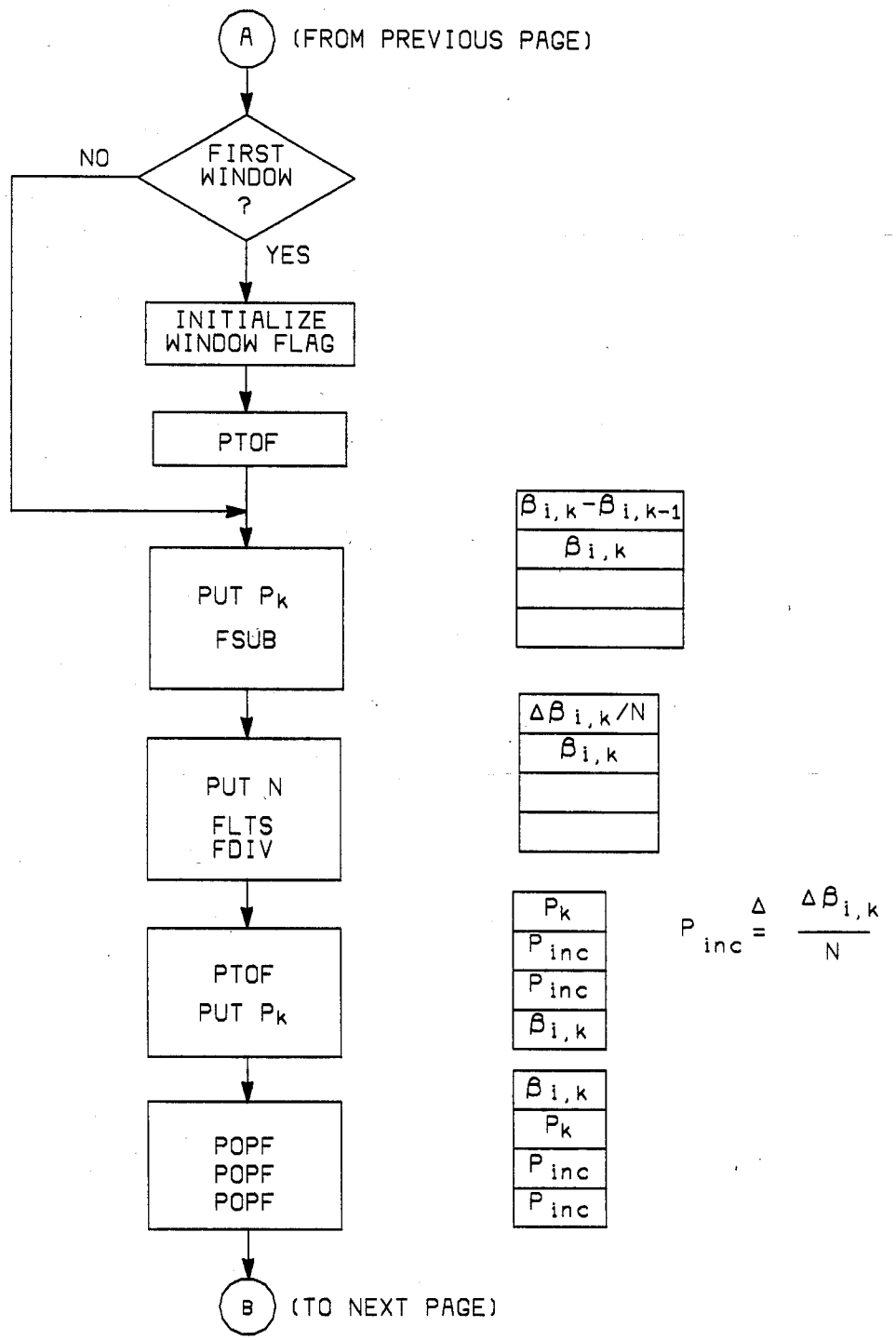
Figure 5H:
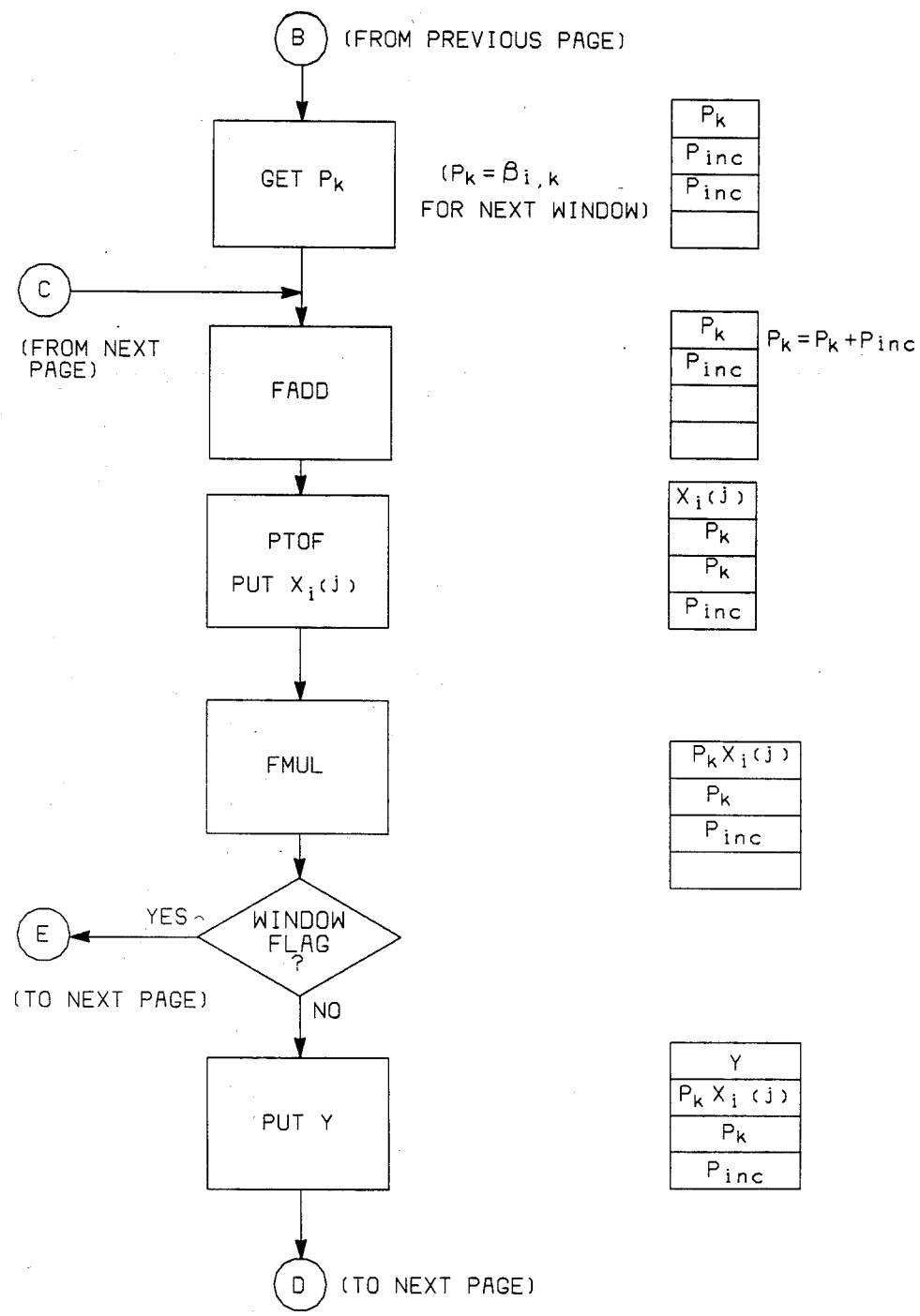
Figure 5I:
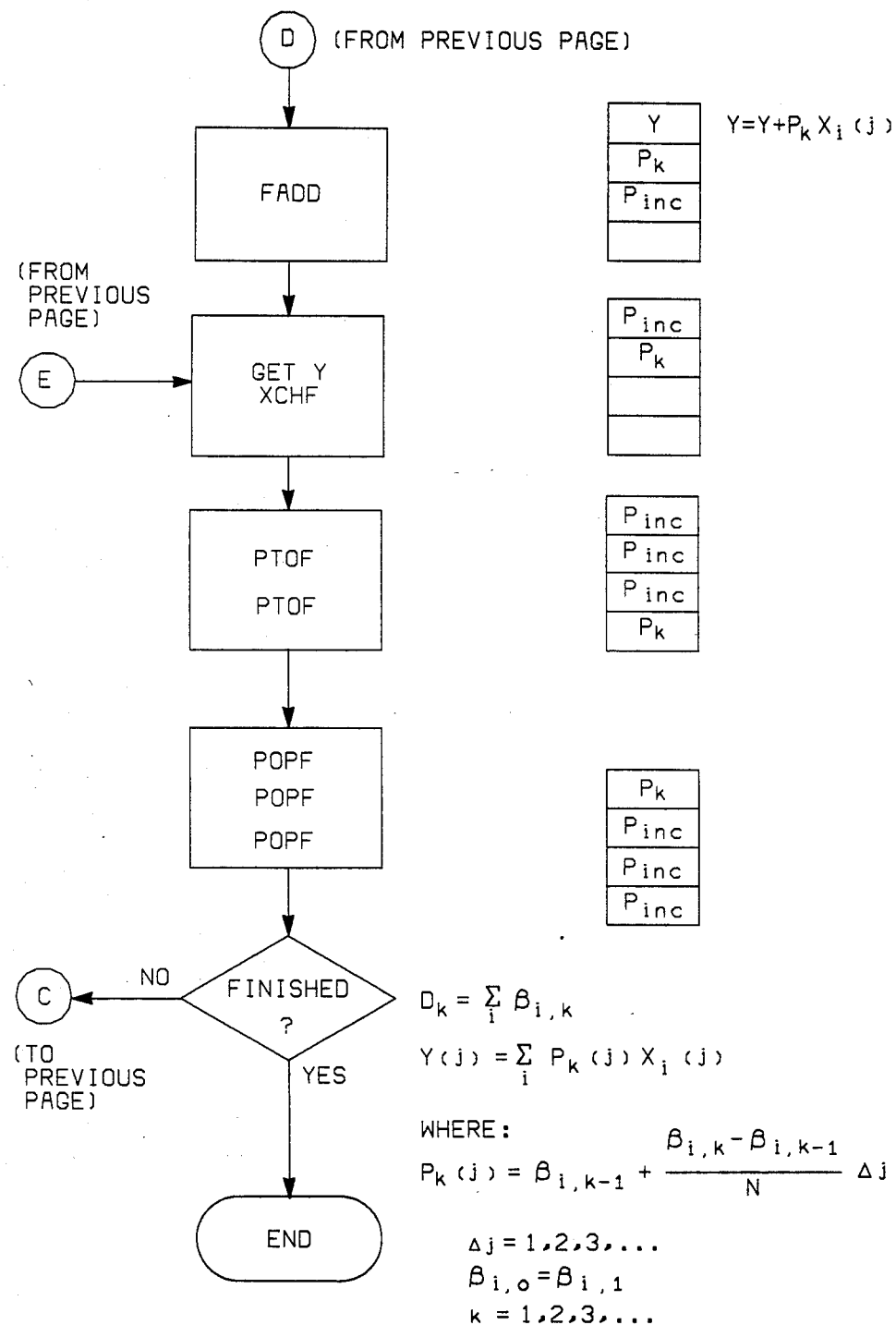
Figure 5J:
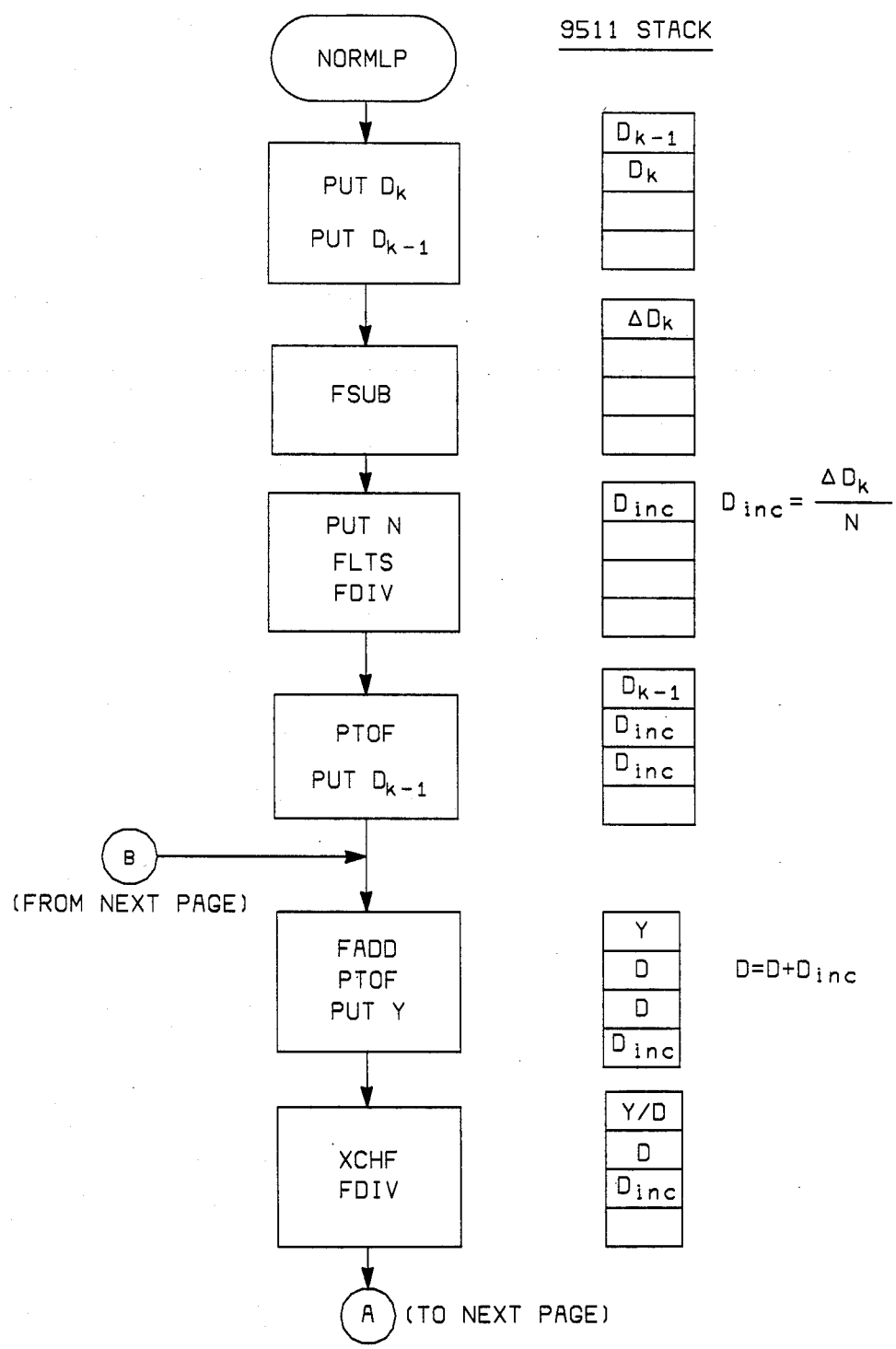
Figure 5K:
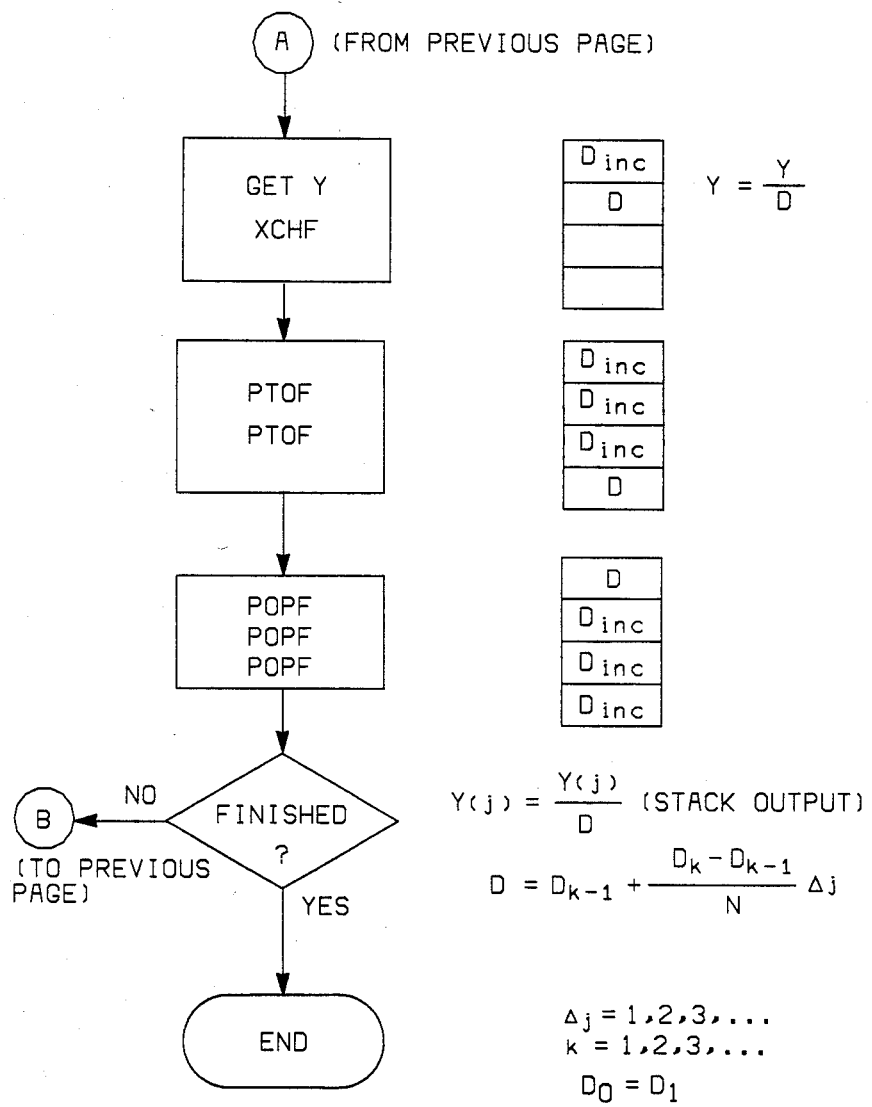
Figure 7D:
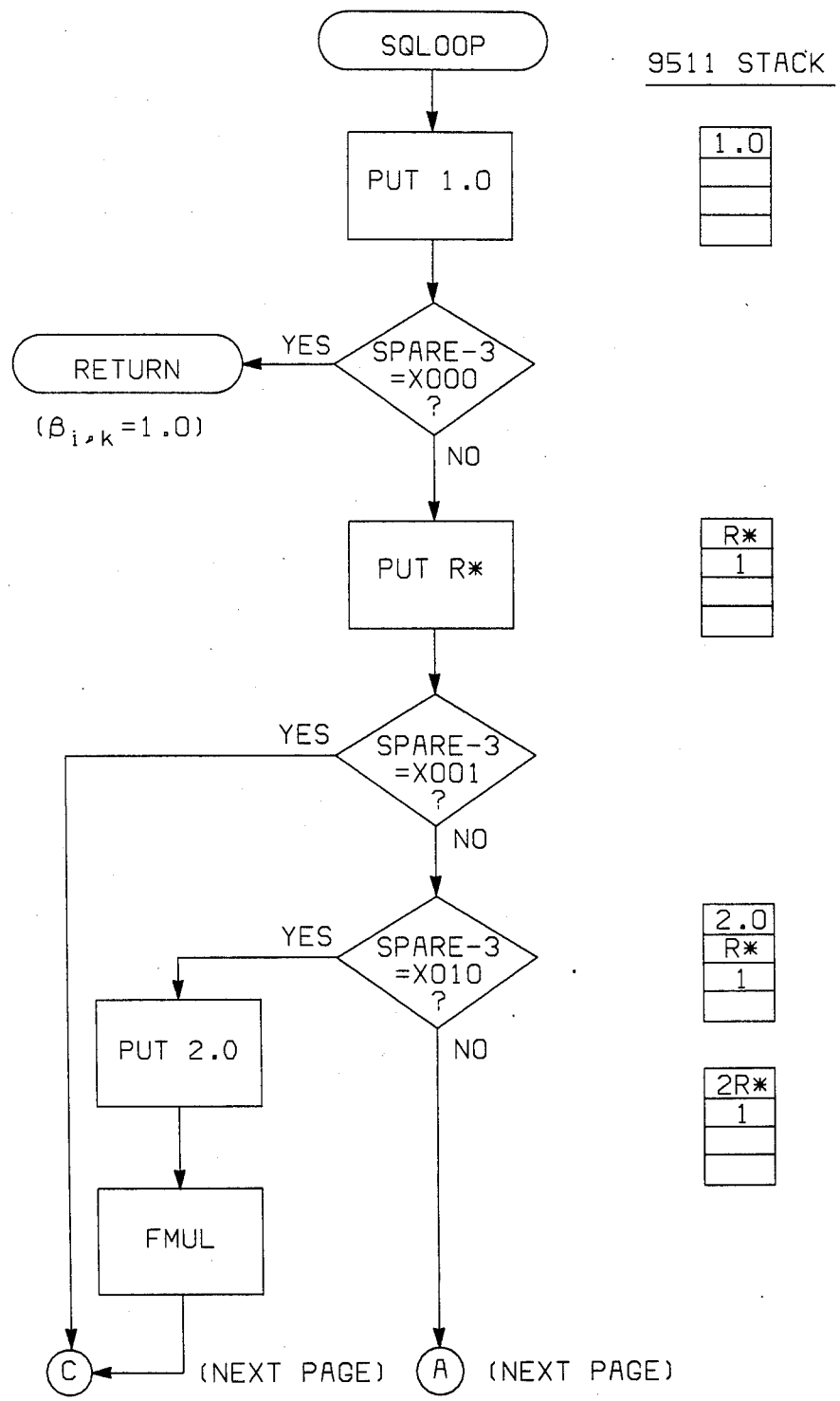
FIG. 7, comprising FIGS. 7D and 7E, when substituted for FIGS. 5D and 5E in FIG. 5, forms a flow chart which illustrates how the recorder of FIG. 3 performs the modified inverse power weighting and vertical stacking method of the invention.
Figure 7E:
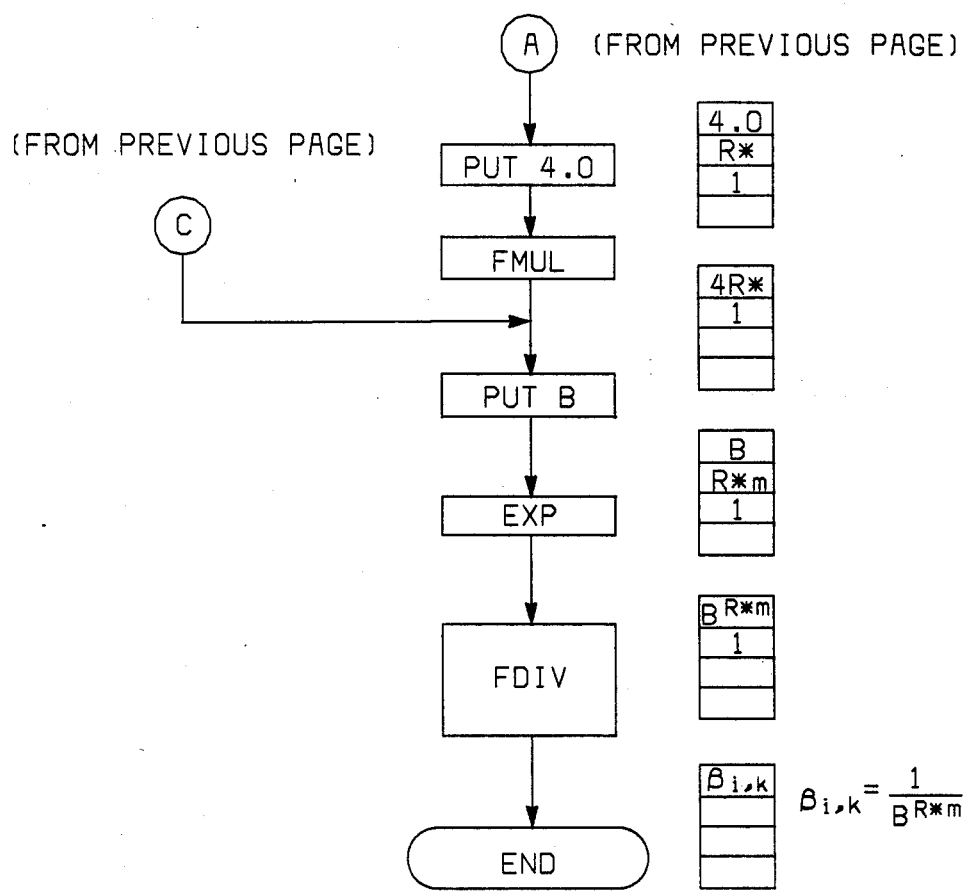

A flow chart of the modified inverse power weighting and vertical stacking method of the invention as implemented by means of the 1802 microprocessor and the 9511 arithmetic processing unit is formed by substituting FIG. 7D for FIG. 5D and FIG. 7E for FIG. 5E and by eliminating FIGS. 5F through 5I in FIG. 5. That is, the flow chart for the modified method of the invention comprises FIGS. 5A through 5C (with the exception of step 52 in FIG. 5B), FIGS. 7D and 7E, and FIGS. 5J and 5K. The modified method of the invention is identical to the preferred method of the invention except for the calculation of the weighting values as shown in FIGS. 7D and 7E.

With the recorder 10, each channel is independent and no thresholding is necessary. Within the recorder 10, no quiet recordings are required to set up thresholds. The relatively low level of such noise as 60 Hz line pickup and the absence of channel cross-talk in the master cable, a very serious problem with conventional seismic digital recording systems, is a further advantage of the recorder 10.

While the invention has been described with a certain degree of particularity, it is manifest that many changes can be made in the details of construction and the arrangement of components without departing from the spirit and scope of this disclosure. It is understood that the invention is not limited to the exemplified embodiments set forth herein but is to be limited only by the scope of the appended claims, including the full range of equivalency to which each element thereof is entitled.

What is claimed is:

1. A method for processing incoming seismic-trace signals acquired during seismic prospecting utilizing plural initiations of a seismic source, comprising the steps of:

improving the signal to noise ratio in incoming seismic trace signals by selecting an exponent from a group of exponents including 0, 1, 2, 4 and 8, for use with a remotely deployed field recorder for inverse power weighting the incoming seismic trace signals based on the ratio of the expected level of seismic signals, which can include reflections, refractions or ground roll, and the expected level of ambient noise, which can include burst noise, dividing each incoming seismic-trace signal into a series of component seismic-trace signals each within a time window of a predetermined length, each component seismic-trace signal comprised of samples of the incoming seismic-trace signal;

calculating a respective weighting value for each respective component seismic-trace signal based on the selected exponent by summing the samples of the respective component seismic-trace signal and next raising the sum to the selected exponent and then taking the inverse of the result;

applying the respective weighting values to the respective component seismic-trace signals; and summing the corresponding weighted component seismic-trace signals from plural initiations of the seismic source for forming a composite seismic-trace signal.

2. The method of claim 1, further comprising the step of scaling the respective calculated weighting values by dividing the respective calculated weighting values by the number of seismic-trace signal samples within each window prior to applying the respective weighting values to the respective component seismic-trace signals.

3. The method of claim 1 wherein the step of applying the respective weighting values to the respective component seismic-trace signals includes applying weighting values based on a linear interpolation between the weighting value calculated for the previous window, if any, and the weighting value calculated for the current window.

4. The method of claim 1, further comprising the step of normalizing the composite seismic-trace signal based on the sum of the weighting values for the seismic-trace signal samples.

5. A remotely deployed field apparatus for processing incoming seismic-trace signals acquired during seismic prospecting utilizing plural initiations of a seismic source, comprising:

means for selecting an exponent from a group of exponents, including 0, 1, 2, 4 and 8, for improving the signal to noise ratio in incoming seismic trace signals for inverse power weighting the incoming seismic trace signals based on the ratio of the expected level of seismic signals, which can include reflections, refractions or ground roll, and the expected level of ambient noise which can include burst noise, means for dividing each incoming seismic-trace signal into a series of component seismic-trace signals each within a time window of a predetermined length, each component seismic-trace signal comprised of samples of the incoming seismic-trace signal;

means for calculating a respective weighting value for each respective component seismic-trace signal based on the selected exponent by summing the samples of the respective component seismic-trace signal and next raising the sum to the selected exponent and then taking the inverse of the result;

means for applying the respective weighting values to the respective component seismic-trace signals; and means for summing the corresponding weighted component seismic-trace signals from plural initiations of the seismic source for forming a composite seismic-trace signal.

6. The apparatus of claim 5, further comprising means for scaling the respective calculated weighting values by dividing the respective calculated weighting values by the number of seismic-trace signal samples within each window prior to application of the respective weighting values to the respective component seismic-trace signals.

7. The apparatus of claim 5 wherein the means for applying the respective weighting values to the respective component seismic-trace signals comprises means for applying weighting values based on a linear interpolation between the weighting value calculated for the previous window, if any, and the weighting value calculated for the current window.

8. The apparatus of claim 5, further comprising means for normalizing the composite seismic-trace signal based on the sum of the weighting values for the seismic-trace signal samples.

9. The apparatus of claim 5, further comprising means for recording the composite seismic-trace signal.

10. A method for processing incoming seismic-trace signals acquired during seismic prospecting utilizing plural initiations of a seismic source, comprising the steps of:

improving the signal to noise ratio in incoming seismic trace signals by selecting an exponent from a group of exponents including 0, 1, 2, 4 and 8, for use with a remotely deployed field recorder for inverse power weighting the incoming seismic trace signals based on the ratio of the expected level of seismic signals, which can include reflections, refractions or ground roll, and the expected level of ambient noise, which can include burst noise, dividing each incoming seismic-trace signal into a series of component seismic-trace signals each within a time window of a predetermined length, each component seismic-trace signal comprised of samples of the incoming seismic-trace signal, each sample being represented in scientific notation having a sample mantissa and an associated sample base raised to an exponent;

calculating a respective weighting value for each respective component seismic-trace signal based on the selected exponent by combining the selected exponent with the sample exponents for the samples of the respective component seismic-trace signals and then taking the inverse of the result;

applying the respective weighting values to the respective component seismic-trace signals; and summing the corresponding weighted component seismic-trace signals from plural initiations of the seismic source for forming a composite seismic-trace signal.

11. The method of claim 10 wherein the step of calculating a respective weighting value for each respective component seismic-trace signal based on the selected exponent includes multiplying the selected exponent by a value chosen from among the RMS, average, and peak values of the sample exponents for the samples of the respective component seismic-trace signal and then taking the inverse of the result.

12. The method of claim 10 wherein the time window is a moving time window of a predetermined length.

13. The method of claim 10, further comprising the step of normalizing the composite seismic-trace signal based on the sum of the weighting values for the seismic-trace signal samples.

14. A remotely deployed field apparatus for processing incoming seismic-trace signals acquired during seismic prospecting utilizing plural initiations of a seismic source, comprising:
  means for selecting an exponent from a group of exponents, including 0, 1, 2, 4 and 8, for improving the signal to noise ratio in incoming seismic trace signals for inverse power weighting the incoming seismic trace signals based on the ratio of the expected level of sesimic signals, which can include reflections, refractions or ground roll, and the expected level of ambient noise which can include burst noise,
  means for dividing each incoming seismic-trace signal into a series of component seismic-trace signals each within a time window of a predetermined length, each component seismic-trace signal comprised of samples of the incoming seismic-trace signal, each sample being represented in scientific notation having a sample mantissa and an associated sample base raised to a exponent sample;
  means for calculating a respective weighting value for each respective component seismic-trace signal based on the selected exponent by combining the selected exponent with the sample exponents for the samples of the respective component seismic-trace signals and then taking the inverse of the result;
  means for applying the respective weighting values to the respective component seismic-trace signals; and
  means for summing the corresponding weighted component seismic-trace signals from plural initiations of the seismic source for forming a composite seismic-trace signal.

15. The apparatus of claim 14 wherein the means for calculating a respective weighting value for each respective component seismic-trace signal based on the selected exponent includes means for multiplying the selected exponent by a value chosen from among the RMS, average, and peak values of the sample exponents for the samples of the respective component seismic-trace signal and then taking the inverse of the result.

16. The method of claim 14 wherein the time window is a moving time window of a predetermined length.

17. The apparatus of claim 14, further comprising means for normalizing the composite seismic-trace signal based on the sum of the weighting values for the seismic-trace signal samples.

18. The apparatus of claim 14, further comprising means for recording the composite seismic-trace signal.

19. A method for improving the signal-to-noise ratio of incoming seismic-trace signals during seismic prospecting utilizing plural initiations of a seismic source, comprising the steps of:
  sampling the incoming seismic-trace signals, thereby forming seismic-trace signal samples; digitizing the seismic-trace signal samples;
  selecting at least one exponent for use in inverse power weighting the digitized seismic-trace signal samples based on the ratio of the expected level of seismic signal and the expected level of ambient noise; and
  processing the digitized seismic-trace signal samples in accordance with the following equation:

$$Y_j = \sum_{i=1}^{M} \beta_i X_{i,j}$$

where:
$\beta_i = [p_1 + (p_2 - p_1)(j/M)]/C$
  = linearly interpolated weighting value $$p_1 = \left[ \frac{1}{N} \sum_{j=0}^{1-N} |X_{i,j}| \right]^{-m}$$

= initial end point for linear interpolation $$p_2 = \left[ \frac{1}{N} \sum_{j=1}^{N} |X_{i,j}| \right]^{-m}$$

= final end point for linear interpolation $$C = \sum_{i=1}^{M} [p_1 + (p_2 - p_1)(j/M)]$$

= normalization factor

N = number of samples in window
M = number of traces in weighted stack
m = selected exponent
$Y_j$ = the jth sample of vertically stacked seismic-trace
$X_{i,j}$ = the jth digitized sample of the ith seismic-trace.

20. A method for improving the signal-to-noise ratio of incoming seismic-trace signals during seismic prospecting utilizing plural initiations of a seismic source, comprising the steps of:
  sampling the incoming seismic-trace signals, thereby forming seismic-trace signal samples; digitizing the seismic-trace signal samples;
  selecting at least one exponent for use in inverse power weighting the digitized seismic-trace signal samples based on the ratio of the expected level of seismic signal and the expected level of ambient noise; and
  processing the digitized seismic-trace signal samples in accordance with the following equation:

$$Y_j = \sum_{i=1}^{M} \beta_i X_{i,j}$$

where:

$\beta_i = B^{-R^*m}/C$ $$C = \sum_{i=1}^{M} B^{-R^*m}$$

= normalization factor

M = number of traces in weighted stack

B = base in which the seismic-trace signal samples are expressed

R* = chosen from among the RMS, average, and peak values of the seismic-trace signal samples' exponents in a given window, m = selected exponent.

$Y_j$ = the jth sample of vertically stacked seismic trace $X_{i,j}$ = the jth digitized sample of the ith seismic trace.

* * * * *

UNITED STATES PATENT OFFICE
CERTIFICATE OF CORRECTION

PATENT NO. : 4,561,074        Page 1 of 2
DATED : December 24, 1985
INVENTOR(S) : Ralph E. Warmack It is certified that error appears in the above-identified patent and that said Letters Patent are hereby corrected as shown below:

Column 1, line 5, "single" should read --signal--.

Column 3, line 4, "there" should read --where--; line 15, "have" should read --has--; line 29, "unstable" should read --unusable--; line 57 (Eq. 1) "$\alpha_1$" should be --$\alpha_i$--.

Column 4, line 24, "mounted" should read --summed--; line 55 (Eq. 7), after "$\beta_i^*$" insert --=--.

Column 5, line 68, "other" should read --one--.

Column 6, line 24, after "accorded" and before "the" delete "as"; line 30, "$s_i \approx \sqrt{\Sigma X_{i,j}^2}$" should read --$s_i \sim \sqrt{\Sigma X_{i,j}^2}$--; line 32 "$n_i^2 \approx \Sigma X_{i,j}^2$" should read --$n_i^2 \sim \Sigma X_{i,j}^2$--.

Column 7, line 35, "is" should read --in--.

Column 10, line 16, "not" should read --no--; line 61, "comrises" should read --comprises--.

Column 11, line 6, "$m \leq 2$" should read --$m \geq 2$--; line 13, "$1\sqrt{2}$" should read --$1/\sqrt{2}$--.

Column 13, line 6, "linearly interpolated weighting value" should read --normalization factor--; line 17, Delete "C=" at beginning of formula; line 19 "normalization factor" should read --linearly interpolated weighting value--.

UNITED STATES PATENT OFFICE
CERTIFICATE OF CORRECTION

PATENT NO. : 4,561,074

DATED : December 24, 1985

INVENTOR(S) : Ralph E. Warmack

It is certified that error appears in the above-identified patent and that said Letters Patent are hereby corrected as shown below:

Column 21, line 37, "exponent sample" should read --sample exponent--.

Signed and Sealed this

Fourth Day of October, 1988

Attest:

DONALD J. QUIGG

Attesting Officer

Commissioner of Patents and Trademarks